(12) United States Patent
Shigeta et al.

(10) Patent No.: US 12,209,925 B2
(45) Date of Patent: Jan. 28, 2025

(54) TORQUE SENSOR AND MANUFACTURING METHOD OF MAGNET ASSEMBLY

(71) Applicant: NSK LTD., Tokyo (JP)

(72) Inventors: Taishi Shigeta, Gunma (JP); Tomofumi Shigeyama, Gunma (JP)

(73) Assignee: NSK LTD., Tokyo (JP)

( * ) Notice: Subject to any disclaimer, the term of this patent is extended or adjusted under 35 U.S.C. 154(b) by 266 days.

(21) Appl. No.: 18/008,309

(22) PCT Filed: Jul. 16, 2021

(86) PCT No.: PCT/JP2021/026741
§ 371 (c)(1),
(2) Date: Dec. 5, 2022

(87) PCT Pub. No.: WO2022/085256
PCT Pub. Date: Apr. 28, 2022

(65) Prior Publication Data
US 2023/0204443 A1 Jun. 29, 2023

(30) Foreign Application Priority Data
Oct. 22, 2020 (JP) ................................ 2020-177335

(51) Int. Cl.
*G01L 5/22* (2006.01)
*B62D 15/00* (2006.01)
*G01L 3/10* (2006.01)

(52) U.S. Cl.
CPC .............. *G01L 3/101* (2013.01); *B62D 15/00* (2013.01); *G01L 5/221* (2013.01)

(58) Field of Classification Search
CPC ......... G01L 3/101; G01L 5/221; G01L 3/104; B62D 15/00; B62D 6/10
See application file for complete search history.

(56) References Cited

U.S. PATENT DOCUMENTS 6,967,047 B2    11/2005  Heinrich
9,448,129 B2    9/2016   Yoshida et al.
(Continued)

FOREIGN PATENT DOCUMENTS

DE    10 2008 047 466 A1    4/2010
JP    2012-194143 A          10/2012
(Continued)

OTHER PUBLICATIONS

International Search Report for PCT/JP2021/026741, dated Sep. 28, 2021.

*Primary Examiner* — David J Bolduc
(74) *Attorney, Agent, or Firm* — Sughrue Mion, PLLC

(57) ABSTRACT

In a torque sensor, a sleeve is an annular member that is attached to a first rotating member. An intermediate member is an annular member that is placed on an outer circumferential surface of the sleeve. A magnet is an annular member that is placed on an outer circumferential surface of the intermediate member. A yoke is attached to a second rotating member and faces the magnet in a radial direction. A rotating member connecting portion of the sleeve has a cylindrical shape and is contact with the first rotating member. An intermediate member connecting portion is at a position shifted with respect to the rotating member connecting portion in an axial direction. The intermediate member includes a thin portion and a thick portion having a thickness greater than that of the thin portion.

15 Claims, 17 Drawing Sheets

(56) References Cited

U.S. PATENT DOCUMENTS

| | | |
|---|---|---|
| 10,948,369 B2 | 3/2021 | Shigeta |
| 2001/0020882 A1 | 9/2001 | Heinrich |
| 2011/0120798 A1* | 5/2011 | Kawada ............... B62D 5/0409 |
| | | 180/444 |
| 2013/0255401 A1* | 10/2013 | Ishimoto ................ G01L 3/104 |
| | | 73/862.325 |
| 2015/0175198 A1* | 6/2015 | Shigeta ................... B62D 6/10 |
| | | 180/443 |
| 2017/0040861 A1* | 2/2017 | Ho ......................... B62D 15/00 |
| 2020/0386636 A1* | 12/2020 | Shigeta ............... B62D 5/0481 |

FOREIGN PATENT DOCUMENTS

| | | |
|---|---|---|
| WO | 2014/046076 A1 | 3/2014 |
| WO | 2019/059230 A1 | 3/2019 |

* cited by examiner

TORQUE SENSOR AND MANUFACTURING METHOD OF MAGNET ASSEMBLY

CROSS REFERENCE TO RELATED APPLICATIONS

This application is a National Stage of International Application No. PCT/JP2021/026741 filed Jul. 16, 2021, claiming priority based on Japanese Patent Application No. 2020-177335 filed Oct. 22, 2020.

FIELD

The present invention relates to a torque sensor and a method of manufacturing a magnet assembly.

BACKGROUND

An electric power steering device installed in a vehicle includes a torque sensor for detecting steering torque. The torque sensor changes its output in accordance with relative rotation of input and output shafts coupled to each other via a torsion bar. An electronic control unit (ECU) controls a motor on the basis of information acquired from the torque sensor, and torque generated by the motor assists steering. For example, Patent Literature 1 describes an example of the torque sensor. In the torque sensor of Patent Literature 1, a magnet is attached to a steering shaft via a sleeve. The sleeve has a small-diameter portion that is press-fitted into the steering shaft, and a large-diameter portion on which the magnet is fixed with an adhesive. This prevents deformation of the large-diameter portion that holds the magnet when the sleeve is press-fitted into the steering shaft. As a result, a distance between the magnet and a yoke hardly deviates from a design value, thereby preventing a reduction in detection accuracy of the torque sensor.

CITATION LIST

Patent Literature

[Patent Literature 1] International Publication No. 2019/059230

SUMMARY

Technical Problem

The magnet is attached to the sleeve with the adhesive in Patent Literature 1. This needs to position the magnet to the sleeve before the magnet is attached to the sleeve, which complicates the production process in producing the torque sensor.

The present disclosure is made in consideration of the above-mentioned problem, and aims to provide a torque sensor and a manufacturing method of a magnet assembly that can prevent a reduction in detection accuracy and simplify the production process.

Solution to Problem

According to an aspect of the disclosure in order to achieve the above aim, a torque sensor includes: an annular sleeve that is attached to a first rotating member; an annular intermediate member that is placed on an outer circumferential surface of the sleeve; an annular magnet that is placed on an outer circumferential surface of the intermediate member; and a yoke that is attached to a second rotating member rotating with respect to the first rotating member and faces the magnet in a radial direction orthogonal to a central axis of the sleeve. The sleeve includes: a rotating member connecting portion that has a cylindrical shape and is in contact with the first rotating member; and an intermediate member connecting portion that has a cylindrical shape and is at a position shifted with respect to the rotating member connecting portion in an axial direction parallel to the central axis. The intermediate member includes: a thin portion; and a thick portion having a thickness greater than a thickness of the thin portion, and an inner circumferential surface of the thin portion and an inner circumferential surface of the thick portion are in contact with the intermediate member connecting portion.

The rotating member connecting portion in contact with the first rotating member prevents deformation of the intermediate member connecting portion that holds the magnet when the sleeve is press-fitted into the first rotating member. This makes it hard for a distance between the magnet and the yoke to deviate from a design value. The torque sensor can prevent a reduction in detection accuracy. Furthermore, the intermediate member includes the thin portion and the thick portion, thereby causing the thick portion to be caught by the outer circumferential surface of the sleeve. This prevents the relative movement of the intermediate member and sleeve in the axial direction and a circumferential direction. When the torque sensor of the disclosure is produced, the production process can be simplified because the magnet is formed on the outer circumferential surface of the intermediate member after the intermediate member is formed on the outer circumferential surface of the sleeve, and thus the need to position the magnet to the sleeve is eliminated.

As a preferable aspect of the torque sensor, an outer diameter of the intermediate member connecting portion is larger than an outer diameter of the rotating member connecting portion.

As a result, stress generated in the rotating member connecting portion in a process of press fitting the sleeve to an input shaft is absorbed by deformation of an enlarged portion between the rotating member connecting portion and the intermediate member connecting portion. This can prevent the stress generated in the press fitting process of the sleeve from being transferred to the intermediate member connecting portion.

As a preferable aspect of the torque sensor, the outer diameter of the intermediate member connecting portion is smaller than the outer diameter of the rotating member connecting portion.

This allows the magnet to be placed more inward in the radial direction than the case where the outer diameter of the intermediate member connecting portion is larger than the outer diameter of the rotating member connecting portion. This makes it possible to downsize the torque sensor.

As a preferable aspect of the torque sensor, the outer diameter of the intermediate member connecting portion and the outer diameter of the rotating member connecting portion are equal.

This allows the magnet to be placed more inward in the radial direction than the case where the outer diameter of the intermediate member connecting portion is larger than the outer diameter of the rotating member connecting portion. This makes it possible to downsize the torque sensor. In addition, the shape of the sleeve is simplified, thereby making it possible to simplify the manufacturing process of the sleeve.

As a preferable aspect of the torque sensor, the magnet includes a tapered portion having a thickness decreasing toward one end in the axial direction, and the tapered portion faces the rotating member connecting portion in the radial direction.

In order to reduce the stress acting on the magnet when the rotating member connecting portion is press-fitted into the first rotating member, a gap in the radial direction is provided between the magnet and the rotating member connecting portion. In order to form the gap, it is necessary to penetrate a mold into the gap when the magnet is formed. In the torque sensor of the disclosure, the magnet includes the tapered portion, thereby making it easy to remove the mold used in forming the magnet.

As a preferable aspect of the torque sensor, the intermediate member includes an even number of thin portions or an even number of thick portions, and when viewed from the axial direction, the even number of thin portions or the even number of thick portions are arranged at equal intervals in the circumferential direction along a circumference centered on the central axis.

Convex portions, which correspond to the thin portions, and concave portions, which correspond to the thin portions, of the sleeve are formed by press working, for example. The even number of convex portions or concave portions that are arranged at equal intervals in the circumferential direction make it easy to perform press working on the sleeve. It is suitable to form the convex portions or the concave portions by press working when the sleeve has a thin cylindrical shape. The sleeve having a thin cylindrical shape makes it possible to achieve a weight reduction in the torque sensor.

As a preferable aspect of the torque sensor, in a cross section including the central axis, the thick portion is between one part of the thin portion and the other part of the thin portion in the axial direction.

If the thick portion placed at the end in the axial direction of the intermediate member stops the movement of the intermediate member relative to the sleeve, it is necessary to provide the thick portions at both ends of the intermediate member. In other words, the thick portions need to be arranged in two rows. In contrast, the torque sensor of the disclosure can stop the movement of the intermediate member relative to the sleeve by at least one thick portion. The torque sensor of the disclosure can reduce the number of thick portions required.

As a preferable aspect of the torque sensor, the intermediate member connecting portion includes a concave portion provided on an outer circumferential surface and a convex portion provided at a position corresponding to the concave portion on an inner circumferential surface.

This allows the concave portion and the convex portion to be easily formed by press working. The torque sensor of the disclosure can simplify the process of forming the portion to which the thick portion is caught on the sleeve.

As a preferable aspect of the torque sensor, the convex portion is placed outside the inner circumferential surface of the rotating member connecting portion in the radial direction.

This prevents the convex portion from hitting the first rotating member when the sleeve is press-fitted into the first rotating member. As a result, no force is directly applied from the first rotating member to the intermediate member connecting portion. The torque sensor of the disclosure can reduce the stress generated in the intermediate member and magnet.

As a preferable aspect of the torque sensor, a distance in the radial direction between the magnet and the yoke is smaller than a thickness difference between the thin portion and the thick portion.

As a result, even if an abnormality occurs in the magnet and the magnet moves in a direction of approaching the yoke, the thick portion remains caught to the sleeve. This prevents the magnet from dropping out from the sleeve. The torque sensor of the disclosure can reduce a possibility of no signal being output.

As a preferable aspect of the torque sensor, the intermediate member is made of resin, the magnet contains magnet powder and resin, and a linear expansion coefficient of the intermediate member is smaller than a linear expansion coefficient of the resin of the magnet.

This allows the torque sensor of the disclosure to reduce the stress generated in the intermediate member and the magnet even when the intermediate member and the magnet are exposed to an environment with temperature changes.

As a preferable aspect of the torque sensor, the intermediate member is made of resin, the magnet contains magnet powder and resin, and the resin of the intermediate member and the resin of the magnet are the same material.

This allows the torque sensor of the disclosure to reduce the stress generated in the intermediate member and the magnet even when the intermediate member and the magnet are exposed to an environment with temperature changes.

In order to achieve the above aim, a manufacturing method of a magnet assembly according to another aspect of the disclosure is a manufacturing method of a magnet assembly of a torque sensor that includes an annular sleeve for attachment to a first rotating member, an annular intermediate member placed on an outer circumferential surface of the sleeve, and an annular magnet placed on an outer circumferential surface of the intermediate member. The sleeve includes: a rotating member connecting portion having a cylindrical shape; and an intermediate member connecting portion that has a cylindrical shape and is at a position shifted with respect to the rotating member connecting portion in an axial direction parallel to a central axis of the sleeve. The manufacturing method includes: a first mold placing step of placing a first mold outside the intermediate member connecting portion; an intermediate member forming step of filling the first mold with resin to form the intermediate member including a thin portion and a thick portion having a thickness greater than a thickness of the thin portion; a second mold placing step of placing a second mold outside the intermediate member; and a magnet forming step of filling the second mold with resin containing magnetic powder to form the magnet.

This causes the intermediate member and the magnet, each of which contains the resin, to adhere firmly to each other. This prevents the relative movement of the intermediate member and the magnet in the axial direction and a circumferential direction. The intermediate member includes the thin portion and the thick portion. This causes the thick portion to be caught on the outer circumferential surface of the sleeve. This prevents the relative movement of the intermediate member and sleeve in the axial direction and the circumferential direction. This reduces the possibility of a positional shift of the magnet. The manufacturing method of the magnet assembly in the disclosure can further prevent a reduction in detection accuracy.

As a preferable aspect of the manufacturing method of a magnet assembly further includes a sleeve machining process of plastically deforming an outer circumferential surface of the intermediate member connecting portion in a radial direction orthogonal to the central axis, prior to the first mold placing step.

This allows the manufacturing method of the magnet assembly of the disclosure to easily form the portion to which the thick portion is caught on the sleeve by press working, for example.

As a preferable aspect of the manufacturing method of a magnet assembly, injection molding is used at the intermediate member forming step and the magnet forming step.

This allows the manufacturing method of the magnet assembly of the disclosure to more easily form the intermediate member and the magnet.

Advantageous Effects of Invention

The torque sensor and the manufacturing method of the magnet assembly of the disclosure can prevent a reduction in detection accuracy and simplify the production process.

DESCRIPTION OF EMBODIMENT

The following describes the invention in detail with reference to the accompanying drawings. The invention is not limited by the following mode (hereinafter referred to as an "embodiment") for implementing the invention. The constituent elements in the following embodiment include those that can be easily conceivable by those skilled in the art, those that are substantially identical thereto, and those that are within a range of equivalents. Furthermore, the constituent elements disclosed in the following embodiment can be combined as appropriate.

Embodiment

Figure 1:
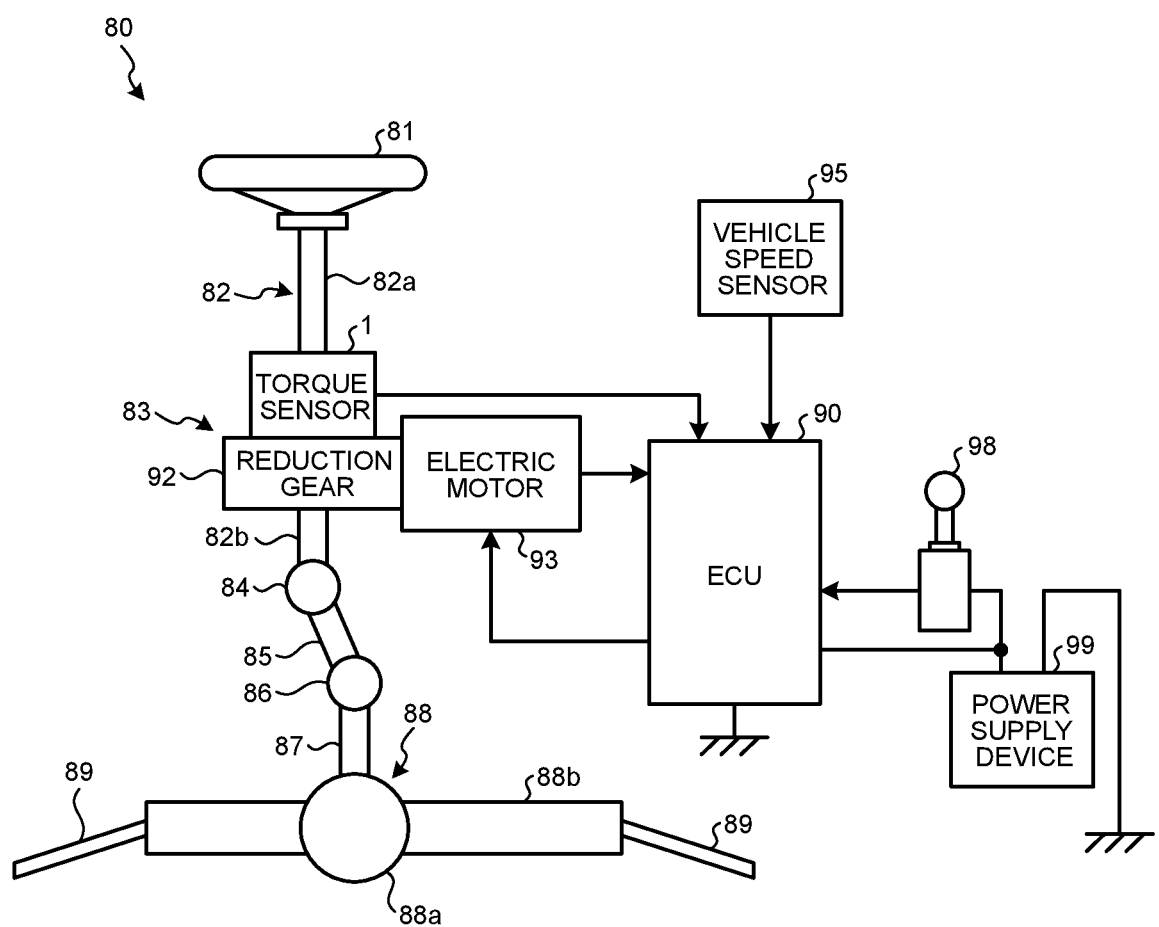
FIG. 1 is a schematic diagram of a steering device in an embodiment.
Figure 2:
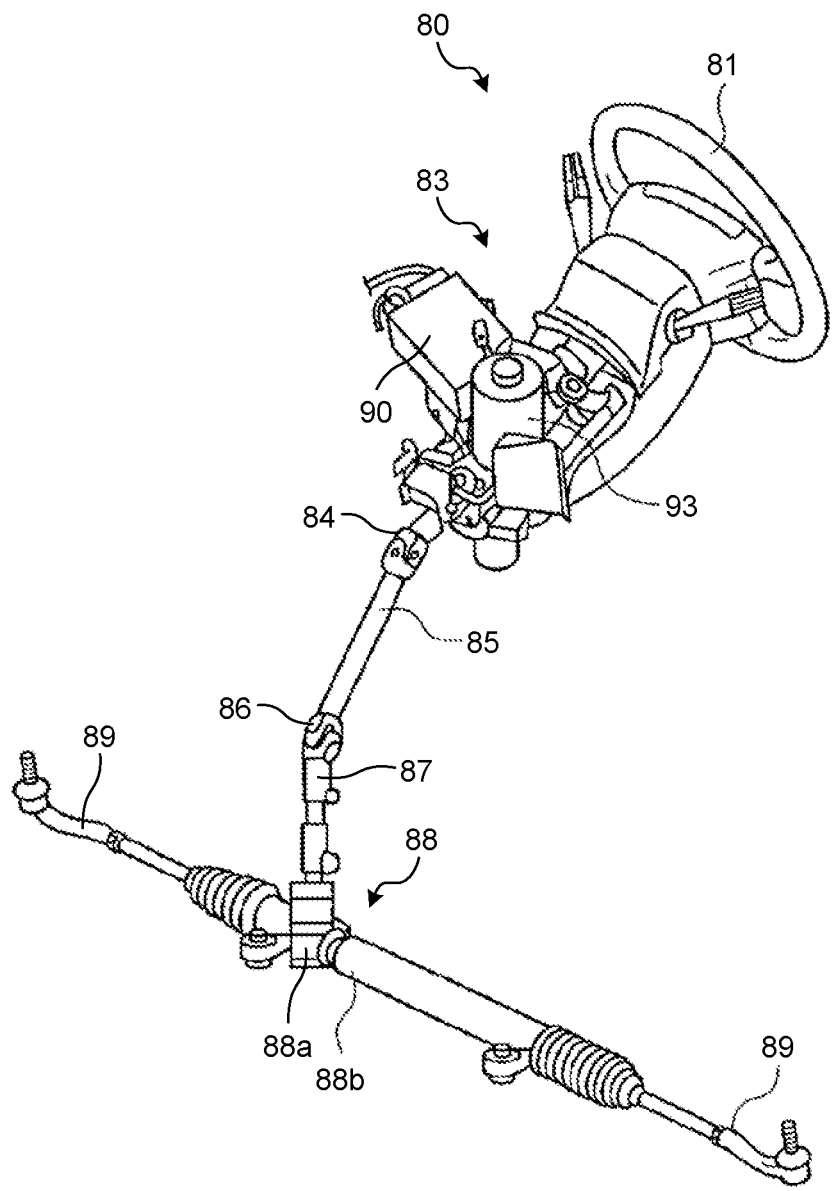
FIG. 2 is a perspective view of the steering device in the embodiment.
Figure 3:
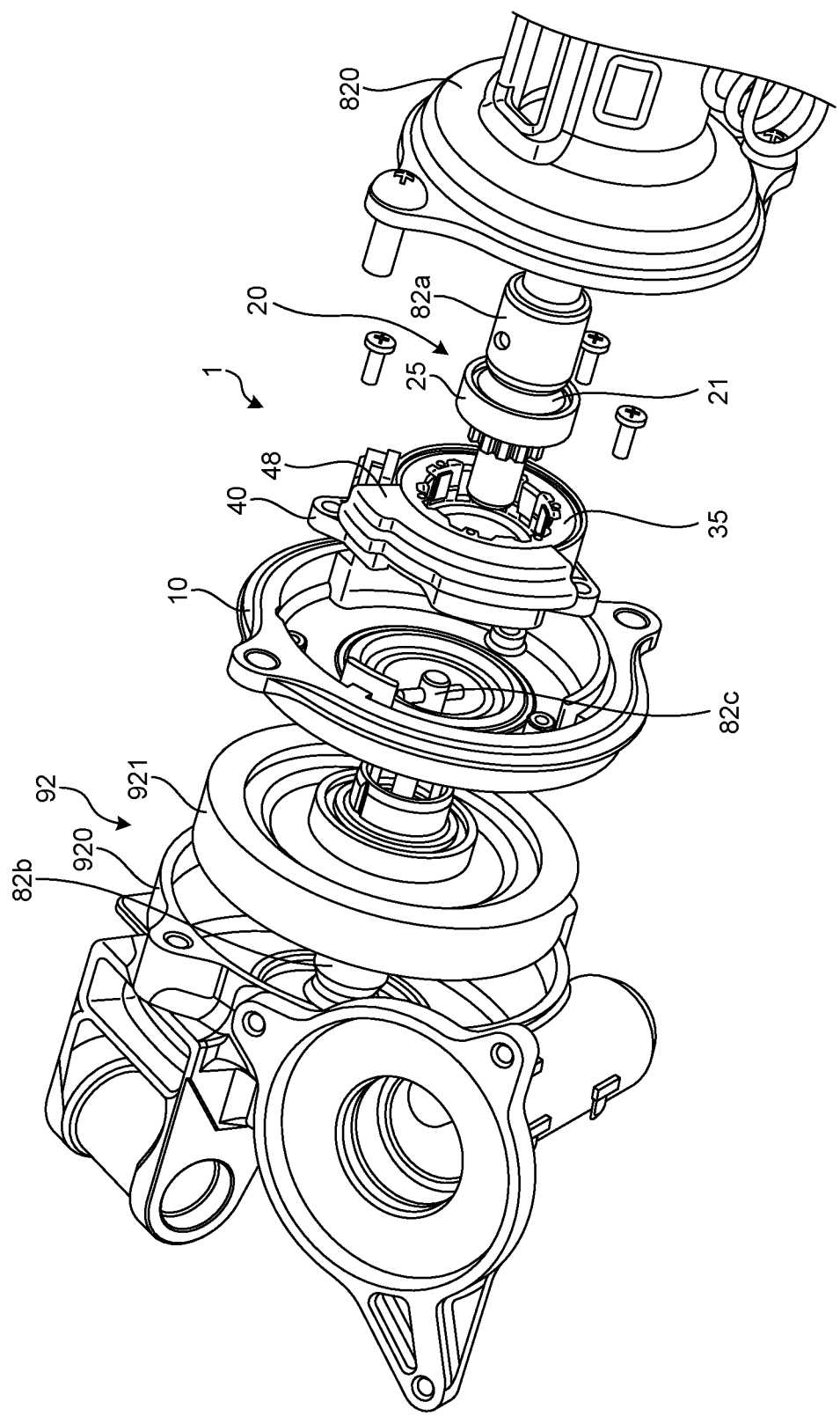
FIG. 3 is an exploded perspective view of the steering device in the embodiment.
Figure 4:
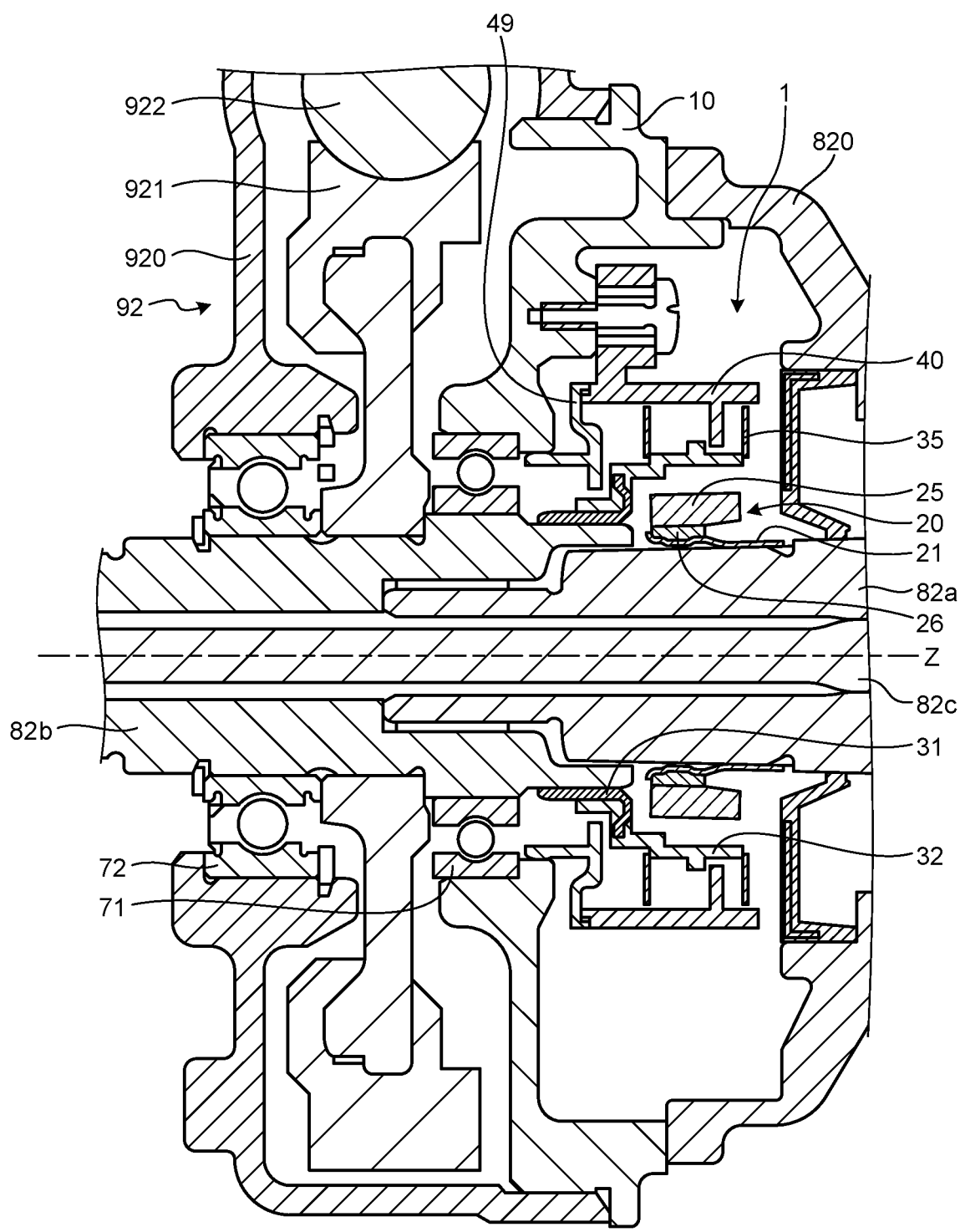
FIG. 4 is a cross-sectional view of the steering device in the embodiment.

FIG. 1 is a schematic diagram of a steering device of an embodiment. FIG. 2 is a perspective view of the steering device in the embodiment. FIG. 3 is an exploded perspective view of the steering device in the embodiment. FIG. 4 is a cross-sectional view of the steering device in the embodiment.

As shown in FIG. 1, this steering device 80 includes, a steering wheel 81, a steering shaft 82, a steering force assist mechanism 83, a universal joint 84, an intermediate shaft 85, and a universal joint 86, which are arranged in the order in which force applied from an operator is transferred. The steering device 80 is joined to a pinion shaft 87. In the following description, a front side of a vehicle in which the steering device 80 is installed is simply referred to as a front side, and a rear side of the vehicle is simply referred to as a rear side. As illustrated in FIG. 2, the steering force assist mechanism 83 is provided near the steering wheel 81 and is placed in a cabin separated from the outside. As illustrated in FIG. 3, the steering device 80 includes a gearbox 920, an intermediate plate 10, and a column housing 820. The gearbox 920 is attached to the vehicle. The column housing 820 is fixed to the gearbox 920 via the intermediate plate 10.

As illustrated in FIGS. 1 and 4, the steering shaft 82 includes an input shaft 82*a*, an output shaft 82*b*, and a torsion bar 82*c*. The input shaft 82*a* is held by the column housing 820 illustrated in FIG. 4 via a bearing. The input shaft 82*a* can rotate with respect to the column housing 820. One end of the input shaft 82*a* is coupled to the steering wheel 81. The other end of the input shaft 82*a* is coupled to the torsion bar 82*c*. The torsion bar 82*c* is fitted in a hole provided at the center of the input shaft 82*a*, and is fixed to the input shaft 82*a* via a pin.

As illustrated in FIG. 4, the output shaft 82*b* is held by the intermediate plate 10 via a bearing 71 and held by the gearbox 920 via a bearing 72. For example, the bearing 71 is press-fitted into the intermediate plate 10, and the bearing 72 is press-fitted into the gearbox 920. The output shaft 82*b* can rotate with respect to the intermediate plate 10 and the gearbox 920. One end of the output shaft 82*b* is coupled to the torsion bar 82*c*. The other end of the output shaft 82*b* is coupled to the universal joint 84. The torsion bar 82*c* is press-fitted into a hole provided at the center of the output shaft 82*b* and is fixed to the output shaft 82*b*.

A front end of the input shaft 82*a* is positioned inside the output shaft 82*b*. A protrusion formed on an outer circumferential surface of the input shaft 82*a* is fitted in a recess formed on an inner circumferential surface of the output shaft 82*b* while a protrusion formed on the inner circumferential surface of the output shaft 82*b* is fitted in a recess formed on the outer circumferential surface of the input shaft 82a. This allows torque to be transferred between the input shaft 82a and the output shaft 82b even when the torsion bar 82c does not function as a coupling member.

As illustrated in FIG. 1, the intermediate shaft 85 couples the universal joint 84 and the universal joint 86. One end of the intermediate shaft 85 is coupled to the universal joint 84, and the other end of the intermediate shaft 85 is coupled to the universal joint 86. One end of the pinion shaft 87 is coupled to the universal joint 86, and the other end of the pinion shaft 87 is coupled to a steering gear 88. The universal joint 84 and the universal joint 86 are Cardan joints, for example. Rotation of the steering shaft 82 is transferred to the pinion shaft 87 via the intermediate shaft 85. In other words, the intermediate shaft 85 rotates together with the steering shaft 82.

As illustrated in FIG. 1, the steering gear 88 includes a pinion 88a and a rack 88b. The pinion 88a is coupled to the pinion shaft 87. The rack 88b is engaged with the pinion 88a. The steering gear 88 converts rotational motion transferred to the pinion 88a into linear motion in the rack 88b. The rack 88b is coupled to a tie rod 89. Angles of wheels are changed by movement of the rack 88b.

As illustrated in FIG. 1, the steering force assist mechanism 83 includes a reduction gear 92 and an electric motor 93. The reduction gear 92 is a worm reduction gear, for example, and includes the gearbox 920, a worm wheel 921, and a worm 922, as illustrated in FIGS. 3 and 4. Torque generated by the electric motor 93 is transferred to the worm wheel 921 via the worm 922, causing the worm wheel 921 to rotate. The worm 922 and the worm wheel 921 increase the torque generated by the electric motor 93. The worm wheel 921 is fixed to the output shaft 82b. For example, the worm wheel 921 is press-fitted into the output shaft 82b. The reduction gear 92, thus, applies auxiliary steering torque to the output shaft 82b. The steering device 80 is a column assist electric power steering device.

As illustrated in FIG. 1, the steering device 80 includes an electronic control unit (ECU) 90, a torque sensor 1, and a vehicle speed sensor 95. The electric motor 93, the torque sensor 1, and the vehicle speed sensor 95 are electrically connected to the ECU 90. The torque sensor 1 outputs steering torque transferred to the input shaft 82a to the ECU 90 via controller area network (CAN) communication. The vehicle speed sensor 95 detects a traveling speed (vehicle speed) of a vehicle body in which the steering device 80 is installed. The vehicle speed sensor 95 is provided to the vehicle body and outputs a vehicle speed to the ECU 90 via the CAN communication.

The ECU 90 controls operation of the electric motor 93. The ECU 90 acquires a signal from each of the torque sensor 1 and the vehicle speed sensor 95. In a state in which an ignition switch 98 is turned on, power is supplied to the ECU 90 from a power supply device 99 (e.g., an in-vehicle battery). The ECU 90 calculates an auxiliary steering instruction value on the basis of the steering torque and the vehicle speed. The ECU 90 adjusts a value of power to be supplied to the electric motor 93 on the basis of the auxiliary steering instruction value. The ECU 90 acquires information about an induced voltage of the electric motor 93 or information output from a resolver installed in the electric motor 93 or the like. The ECU 90 controls the electric motor 93 to reduce force required to operate the steering wheel 81.

Figure 5:
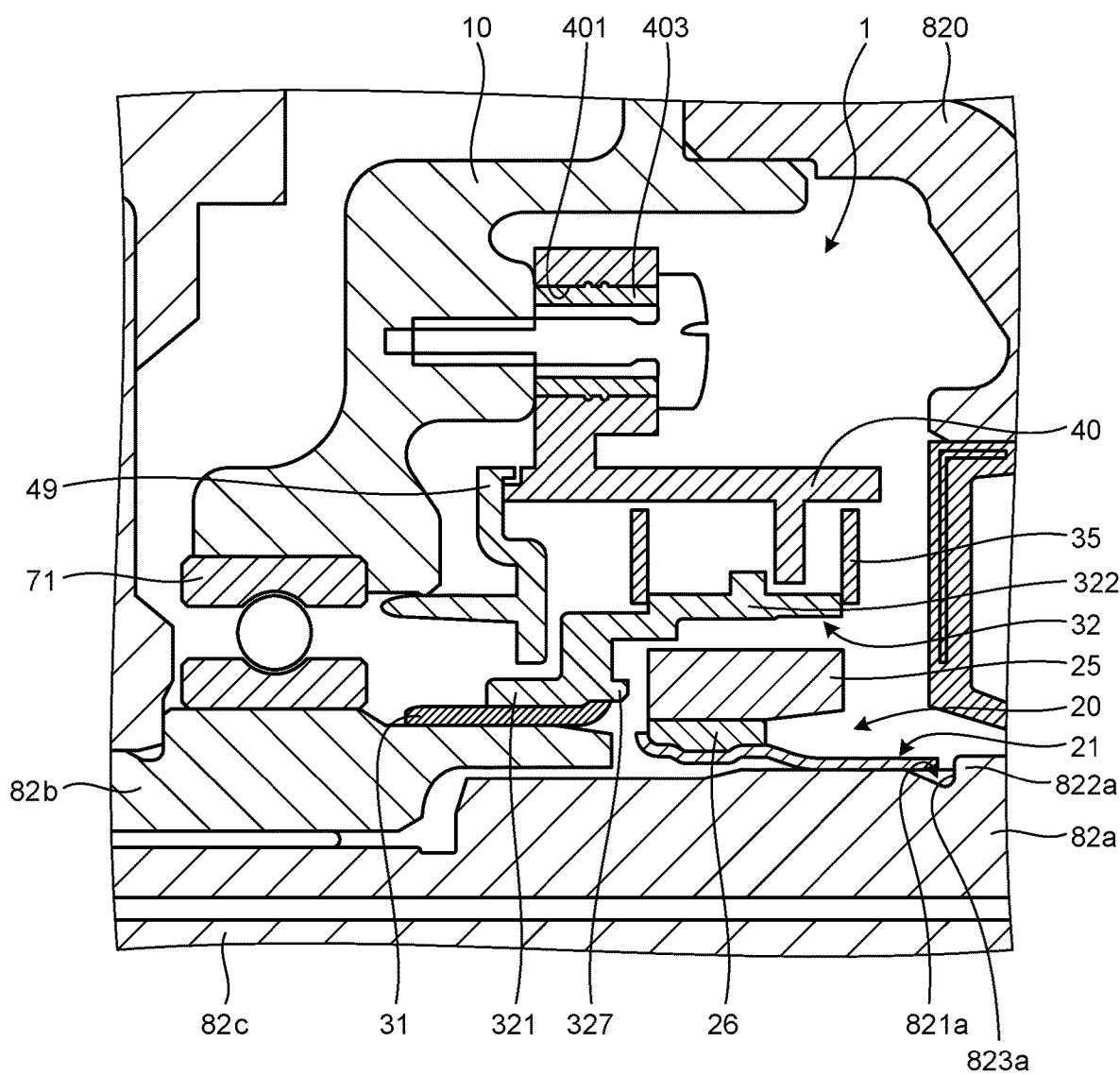
FIG. 5 is an enlarged view of part of FIG. 4.
Figure 6:
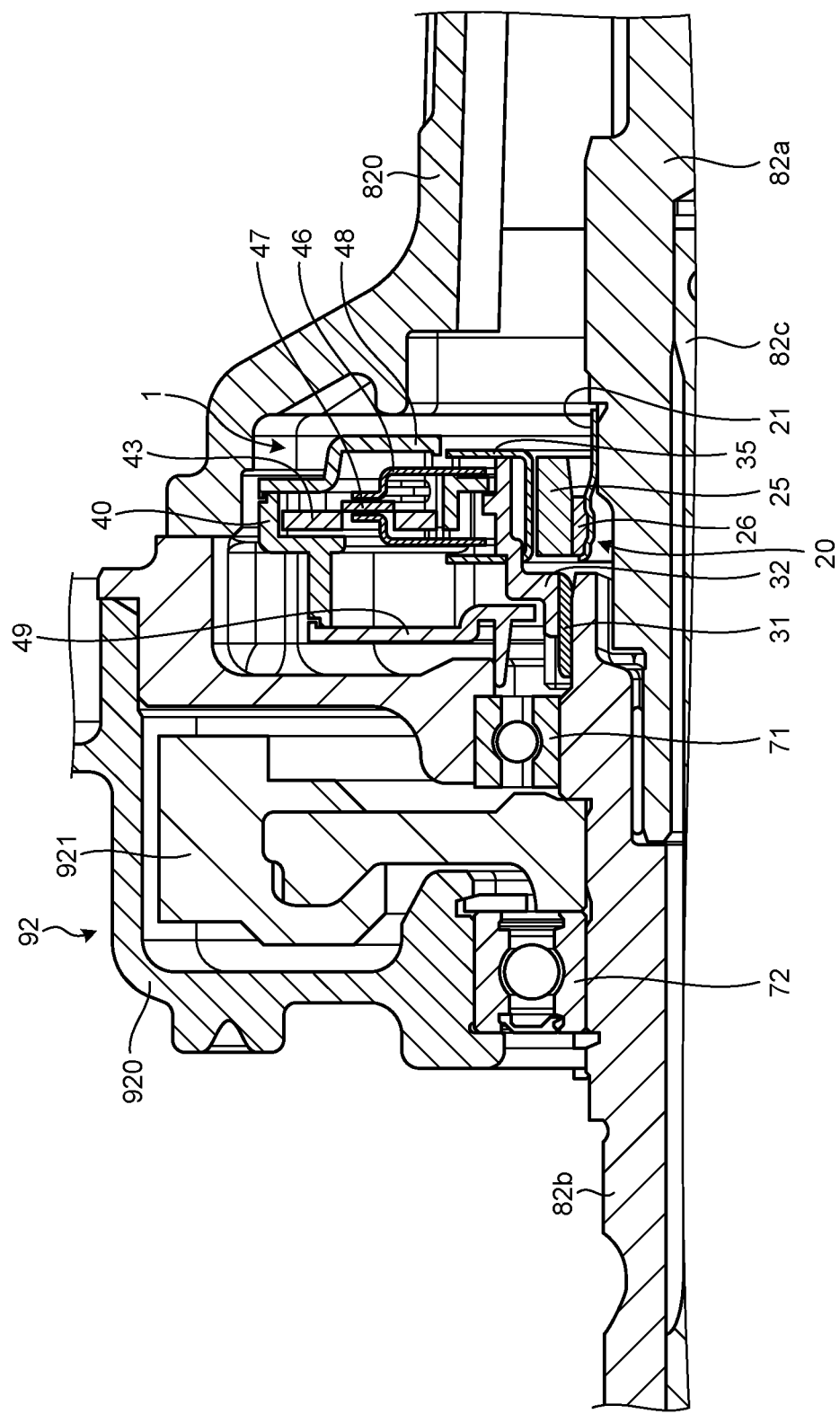
FIG. 6 is a cross-sectional view of the steering device on the embodiment taken along a plane different from that in FIG. 4.
Figure 7:
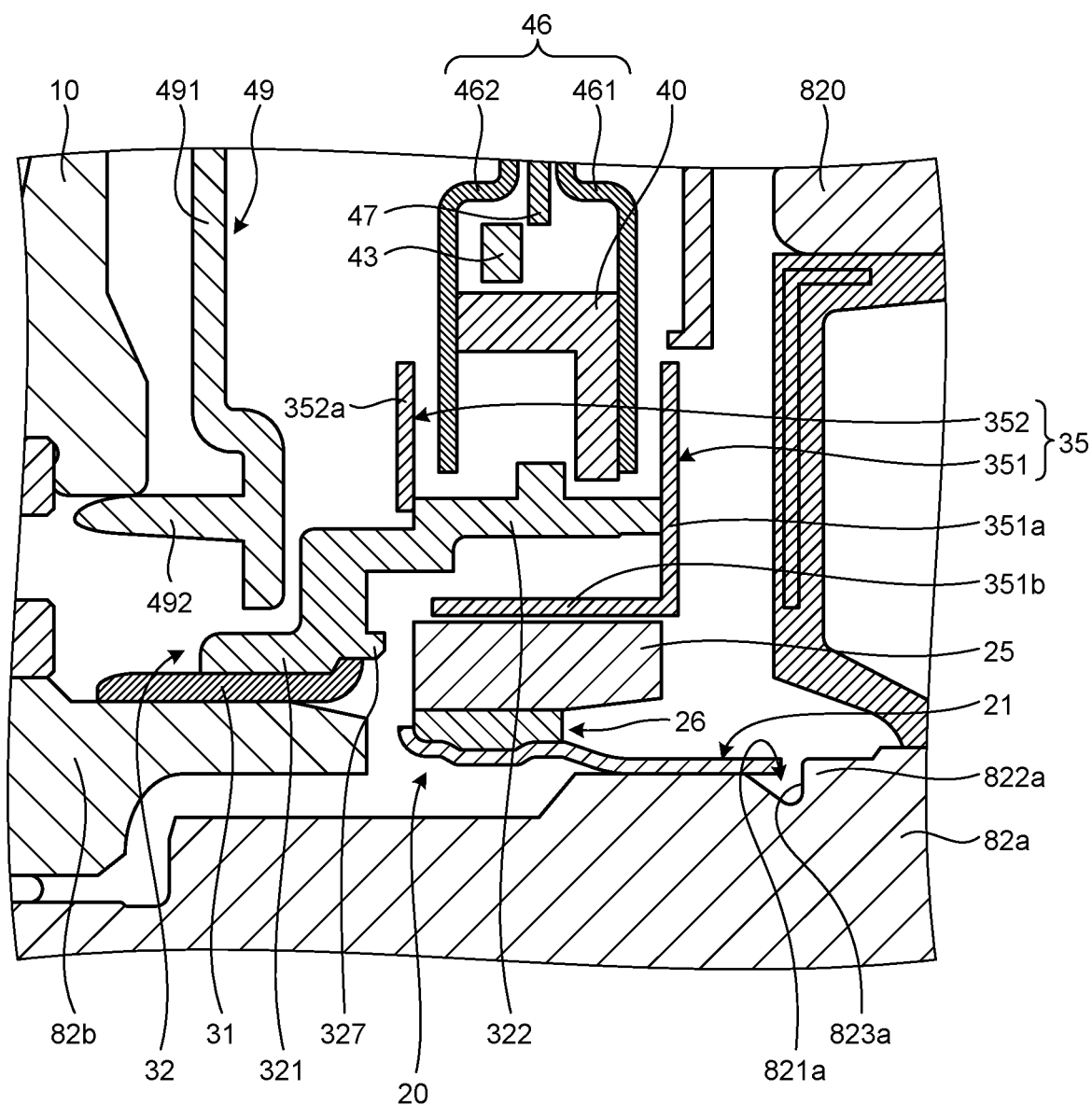
FIG. 7 is an enlarged view of part of FIG. 6.
Figure 8:
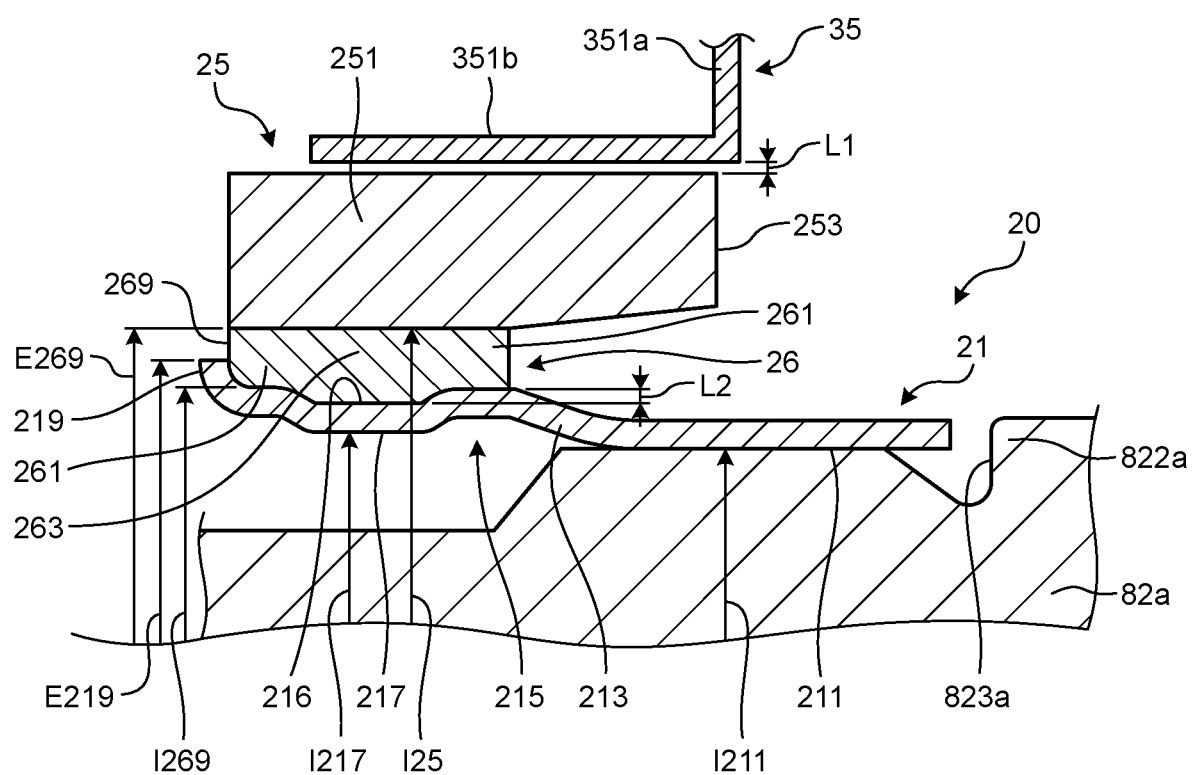
FIG. 8 is a cross-sectional view of a periphery of a magnet assembly in the embodiment.
Figure 9:
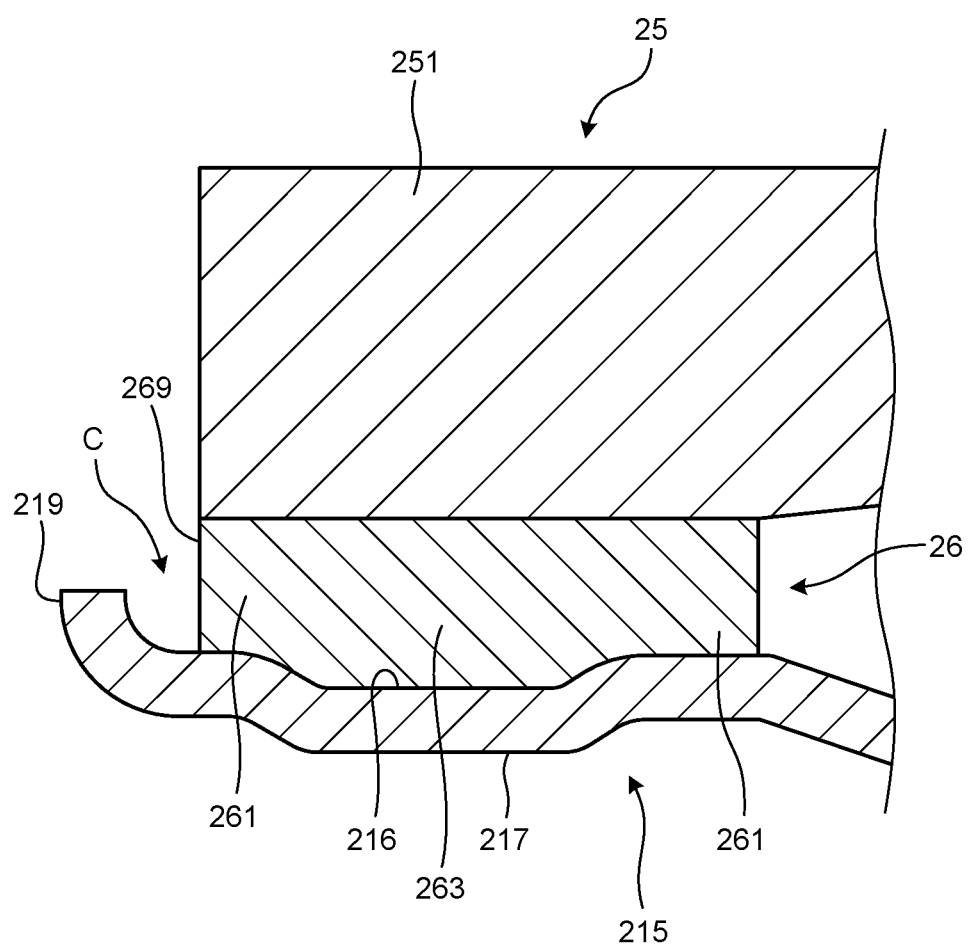
FIG. 9 is an enlarged view of part of FIG. 8.
Figure 10:
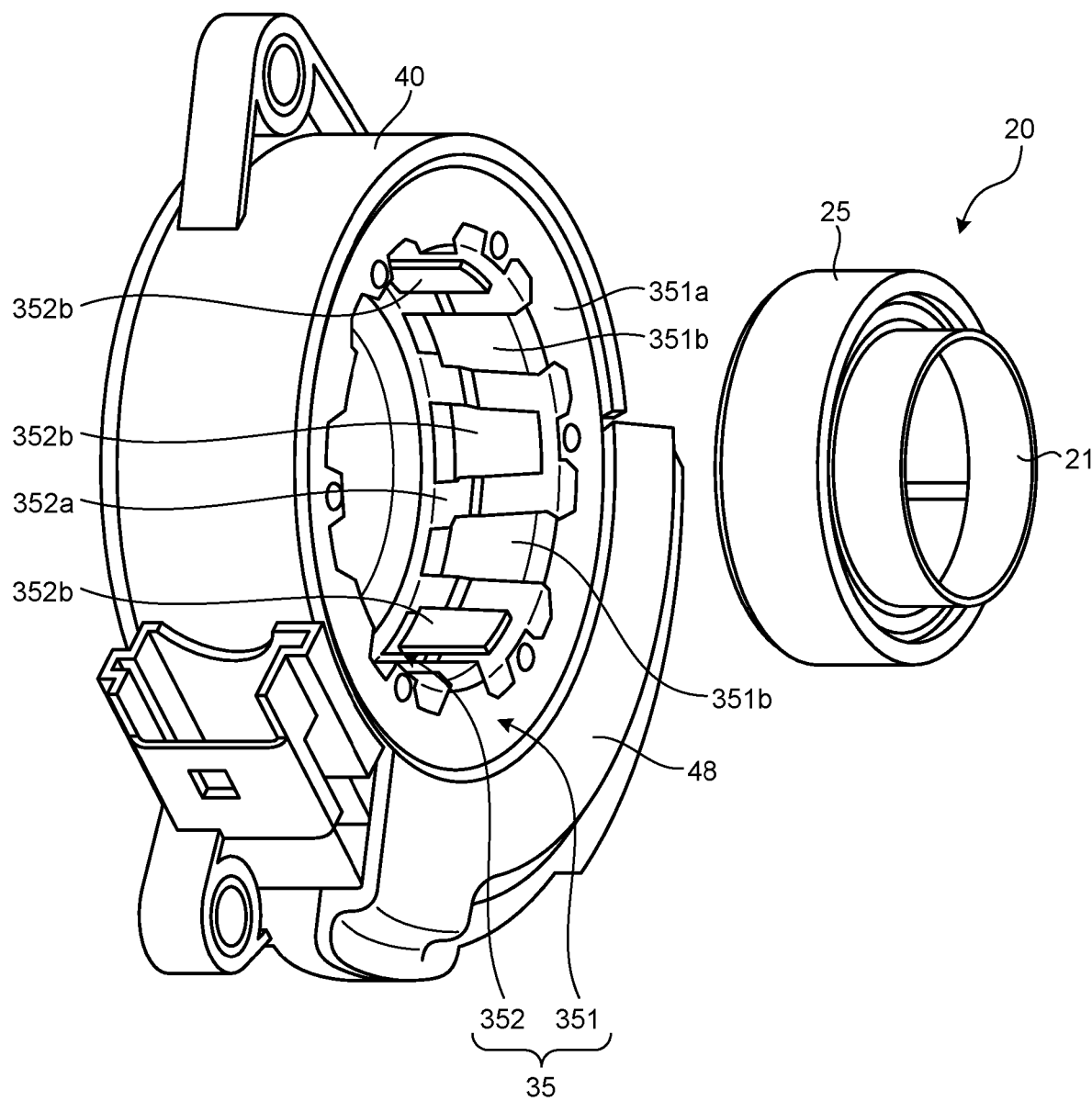
FIG. 10 is an exploded perspective view of the magnet assembly, a yoke, and the like in the embodiment.
Figure 11:
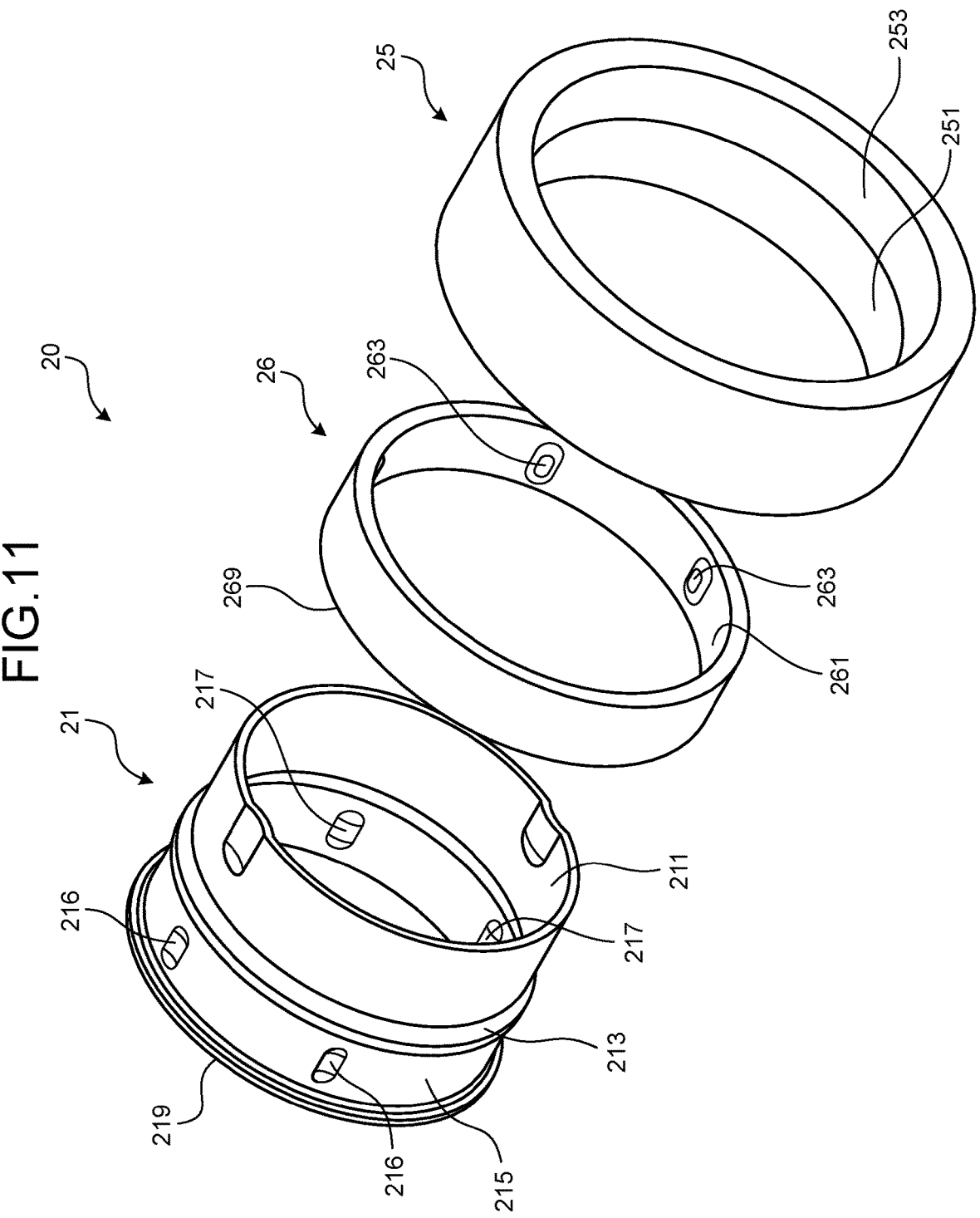
FIG. 11 is an exploded perspective view of the magnet assembly in the embodiment.

FIG. 5 is an enlarged view of part of FIG. 4. FIG. 6 is a cross-sectional view of the steering device in the embodiment taken along a plane different from that in FIG. 4. FIG. 7 is an enlarged view of part of FIG. 6. FIG. 8 is a cross-sectional view of a periphery of a magnet assembly in the embodiment. FIG. 9 is an enlarged view of part of FIG. 8. FIG. 10 is an exploded perspective view of the magnet assembly, a yoke, and the like in the embodiment. FIG. 11 is an exploded perspective view of the magnet assembly in the embodiment.

As illustrated in FIG. 4, the torque sensor 1 is placed between the column housing 820 and the gearbox 920. More specifically, the torque sensor 1 is positioned in a space between the column housing 820 and the intermediate plate 10. As illustrated in FIGS. 4 to 7, the torque sensor 1 includes a magnet assembly 20, a sleeve 31 (second sleeve), a carrier 32, a yoke 35, a sensor housing 40, a magnetic flux collecting member 46, a printed board 43, a Hall IC 47, a first cover 48, and a second cover 49. As illustrated in FIG. 8, the magnet assembly 20 includes a sleeve 21 (first sleeve), an intermediate member 26, and a magnet 25.

The sleeve 21 is a non-magnetic body and is made of metal. A specific example of the metal serving as the non-magnetic body is austenitic stainless steel (SUS304). As illustrated in FIG. 5, the sleeve 21 is a cylindrical member and is attached to the input shaft 82a. The sleeve 21 is formed by deep drawing, for example. The sleeve 21 includes a rotating member connecting portion 211, an intermediate member connecting portion 215, and an enlarged portion 213. In the following description, the direction parallel to a central axis Z of the sleeve 21 is described as an axial direction. The direction parallel to the straight line that is orthogonal to the central axis Z and passes through the central axis Z is described as a radial direction. The direction along a circumference centered on the central axis Z is described as a circumferential direction. The central axis Z is the straight line coinciding with the rotation axis of the input shaft 82a.

As illustrated in FIG. 8, the rotating member connecting portion 211 is a cylindrical member that is press-fitted into the outer circumferential surface of the input shaft 82a. A rear end surface of the rotating member connecting portion 211 faces an end surface 823a of a raised portion 822a of the input shaft 82a. An annular groove 821a is provided to a portion of the input shaft 82a, the portion corresponding to a rear end of the rotating member connecting portion 211. The intermediate member connecting portion 215 is a cylindrical member. An outer diameter of the intermediate member connecting portion 215 is larger than that of the rotating member connecting portion 211. The intermediate member connecting portion 215 is at a position shifted with respect to the rotating member connecting portion 211 in the axial direction. The intermediate member connecting portion 215 is positioned on the front side of the rotating member connecting portion 211. The enlarged portion 213 connects the rotating member connecting portion 211 and the intermediate member connecting portion 215. The outer diameter of the enlarged portion 213 increases from the rotating member connecting portion 211 toward the intermediate member connecting portion 215.

The enlarged portion 213 that connects the rotating member connecting portion 211 and the intermediate member connecting portion 215 allows the rotating member connecting portion 211 and the intermediate member connecting portion 215 to be placed apart in the axial direction and apart in the radial direction. The sleeve 21 thus configured causes the stress generated in the rotating member connecting portion 211 in a process in which the sleeve 21 is press-fitted into the input shaft 82a to be absorbed by deformation of the enlarged portion 213, thereby making it possible to prevent the transfer of the stress generated in the press-fitting process of the sleeve 21 to the intermediate member connecting portion 215.

This configuration can prevent the transfer of the stress generated in the press-fitting process to the magnet 25 via the intermediate member connecting portion 215 and the intermediate member 26, because the magnet 25 is placed above the intermediate member connecting portion 215 via the intermediate member 26. In this way, the magnet 25 is prevented from stress acting thereon, thereby making it possible to prevent sensor output characteristics from deteriorating due to demagnetization of the magnet 25.

As illustrated in FIG. 8, the intermediate member connecting portion 215 includes a plurality of concave portions 216, a plurality of convex portions 217, and a sleeve end 219. The concave portions 216 are provided on the outer circumferential surface of the intermediate member connecting portion 215. The convex portions 217 are provided on the inner circumferential surface of the intermediate member connecting portion 215. The convex portions 217 are provided on the back sides of the concave portions 216. The concave portions 216 and the convex portions 217 are formed at once by press working, for example. In other words, the concave portions 216 and the convex portions 217 are formed by plastically deforming the outer circumferential surface of the intermediate member connecting portion 215 inward in the radial direction. The convex portions 217 are arranged outside of the inner circumferential surface of the rotating member connecting portion 211 in the radial direction. In other words, an inner diameter I217 of the convex portion 217 is larger than an inner diameter I211 of the rotating member connecting portion 211. The number of concave portions 216 and the number of convex portions 217 are each an even number. As illustrated in FIG. 11, the even number of concave portions 216 and the even number of convex portions 217 are arranged at equal intervals in the circumferential direction. As a result, for one set of the concave portion 216 and the convex portion 217, there is another set of the concave portion 216 and the convex portion 217 on the opposite side across the central axis Z. The sleeve end 219 is the end of the intermediate member connecting portion 215 on the opposite side (front side) from the rotating member connecting portion 211. The sleeve end 219 extends outward in the radial direction.

As illustrated in FIG. 8, the intermediate member 26 is placed on the outer circumferential surface of the intermediate member connecting portion 215. The intermediate member 26 is formed in an annular shape. The intermediate member 26 is made of resin. Specific examples of the resin include polyphenylene sulfide (PPS) and polyamide 12 (PA12).

The intermediate member 26 includes a thin portion 261, a plurality of thick portions 263, and an intermediate member end 269. The thickness of the thick portion 263 is greater than that of the thin portion 261. The thickness refers to the thickness in the radial direction and is used in the same sense in the following description. In this embodiment, as illustrated in FIG. 11, the thin portion 261 is formed in an annular shape and an even number of thick portions 263 are arranged at equal intervals in the circumferential direction. As illustrated in FIG. 8, in the cross section including the central axis Z, the thick portion 263 is between one part of the thin portion 261 and the other part of the thin portion 261 in the axial direction. The thick portion 263 is sandwiched between the thin portion 261 from both sides in the axial direction. In other words, in the cross section including the central axis Z, the thickness of the intermediate member 26 is not constant, but varies depending on its position in the axial position. The inner circumferential surfaces of the thin portion 261 and the thick portions 263 are in contact with the outer circumferential surface of the intermediate member connecting portion 215. The inner end in the radial direction of the thick portion 263 is in the concave portion 216 of the intermediate member connecting portion 215.

The intermediate member end 269 is the end of the intermediate member 26 on the opposite side (front side) from the rotating member connecting portion 211. When viewed from the axial direction, a part of the intermediate member end 269 overlaps with the sleeve end 219. An outer diameter E219 of the sleeve end 219 is larger than an inner diameter I269 of the intermediate member end 269 and smaller than an outer diameter E269 of the intermediate member end 269. As illustrated in FIG. 9, the intermediate member end 269 is placed with a gap C in the axial direction with respect to the sleeve end 219. The gap C is exaggeratingly illustrated in FIG. 9, and the size of the gap C illustrated may be different from the actual size.

As illustrated in FIG. 8, the magnet 25 is placed on the outer circumferential surface of the intermediate member 26. The magnet 25 is formed in an annular shape. The S and N poles of the annular magnet 25 are arranged alternately in the circumferential direction. The magnet 25 is attached to the sleeve 21 via the intermediate member 26. As a result, the magnet 25 rotates with the input shaft 82a and the sleeve 21. The magnet 25 faces the yoke 35 with a gap in the radial direction therebetween. A distance L1 in the radial direction between the magnet 25 and the yoke 35 is smaller than a thickness difference L2 between the thin portion 261 and the thick portion 263. The thickness difference L2 can also be referred to as the step between the thin portion 261 and the thick portion 263.

The magnet 25 contains magnetic powder, which is a hard magnetic body, and resin. The magnet 25 is formed by solidifying a mixture material of the magnet powder and the resin. The magnet 25 is called a bonded magnet. A specific example of the hard magnetic bodies is Ferrite or neodymium. Specific examples of the resin include polyphenylene sulfide (PPS) and polyamide 12 (PA12). In this embodiment, a coefficient of linear expansion of the intermediate member 26 is smaller than that of the resin contained in the magnet. The resin used for the magnet 25 may be the same as the resin used for the intermediate member 26.

As illustrated in FIG. 8, the magnet 25 includes an attaching portion 251 and a tapered portion 253. The attaching portion 251 is the portion in contact with the intermediate member 26. The thickness of the attaching portion 251 is constant. The tapered portion 253 is placed on the rear side of the attaching portion 251. The tapered portion 253 faces the rotating member connecting portion 211 in the radial direction. The thickness of the tapered portion 253 decreases toward one end (rear side) in the axial direction. The thickness of the tapered portion 253 decreases as it moves away from the attaching portion 251. More specifically, the outer diameter of the tapered portion 253 is constant, and only the inner diameter of the tapered portion 253 increases as it moves away from the attaching portion 251. For example, the length in the axial direction of the tapered portion 253 is between ¼ and ½ inclusive of the length in the axial direction of the whole of the magnet 25. When viewed from the axial direction, the magnet 25 does not overlap with the sleeve end 219. The outer diameter E219 of the sleeve end 219 is smaller than a minimum inner diameter 125 of the magnet 25.

The sleeve 31 is a non-magnetic body and is made of metal. A specific example of the metal serving as the non-magnetic body is austenitic stainless steel (SUS304). As illustrated in FIG. 5, the sleeve 31 is a cylindrical member and is attached to the output shaft 82b. Specifically, the sleeve 31 is press-fitted into the outer circumferential surface of the output shaft 82b. The front end surface of the sleeve 31 is not in contact with the output shaft 82b. In other words, there is a gap in the axial direction between the front end surface of the sleeve 31 and the output shaft 82b. The position in the axial direction of the rear end surface of the sleeve 31 coincides with the position in the axial direction of the rear end surface of the output shaft 82b. By aligning the rear end surface of the sleeve 31 with the rear end surface of the output shaft 82b, the position of the sleeve 31 is determined.

The carrier 32 is a non-magnetic body. For example, the carrier 32 is made of resin. A specific example of the resin is polybutylene terephthalate (PBT) or polyacetal resin (POM). The carrier 32 is a cylindrical member and is attached to the output shaft 82b via the sleeve 31. As illustrated in FIG. 5, the carrier 32 includes a small-diameter portion 321, a large-diameter portion 322, and a projection 327. As illustrated in FIG. 5, the carrier 32 is integrally formed with the sleeve 31 by injection molding. The small-diameter portion 321 is a cylindrical member and is in contact with the outer circumferential surface of the sleeve 31. The large-diameter portion 322 is a cylindrical member. The outer diameter of the large-diameter portion 322 is larger than that of the small-diameter portion 321. The large-diameter portion 322 is positioned on the rear side of the small-diameter portion 321. The front end of the large-diameter portion 322 is connected to the rear end of the small-diameter portion 321. The projection 327 protrudes on the rear side from the rear end surface of the small-diameter portion 321 and faces the magnet 25. There is a gap between the projection 327 and the magnet 25.

As illustrated in FIG. 10, the yoke 35 includes a first yoke 351, and a second yoke 352. The first yoke 351 and the second yoke 352 are soft magnetic bodies. A specific example of the soft magnetic body is a nickel-iron alloy. The first yoke 351 and the second yoke 352 are fixed to the carrier 32. The first yoke 351 and the second yoke 352 rotate together with the output shaft 82b, the sleeve 31 and the carrier 32. The first yoke 351 includes a first ring portion 351a and a plurality of first teeth 351b. The first ring portion 351a is a plate that is orthogonal to the axial direction. The first teeth 351b protrude on the front side from the first ring portion 351a. The first teeth 351b are arranged at equal intervals in the circumferential direction. The second yoke 352 includes a second ring portion 352a and a plurality of second teeth 352b. The second ring portion 352a is a plate parallel to the first ring portion 351a, and is positioned on the front side of the first ring portion 351a. The second teeth 352b protrude on the rear side from the second ring portion 352a. The second teeth 352b are arranged at equal intervals in the circumferential direction. A single second tooth 352b is positioned between two first teeth 351b. In other words, the first tooth 351b and the second tooth 352b are arranged alternately in the circumferential direction. The first teeth 351b and the second teeth 352b face the magnet 25.

The sensor housing 40 is a non-magnetic body. For example, the sensor housing 40 is made of resin. A specific example of the resin is polybutylene terephthalate (PBT) or polyamide 66. As illustrated in FIG. 5, a bush 403 is installed in a hole 401 of the sensor housing 40. For example, the bush 403 is made of an aluminum alloy, for example, and is integrally formed with the sensor housing 40. The sensor housing 40 is fixed to the intermediate plate 10 by a bolt penetrating the bush 403.

As illustrated in FIG. 7, the magnetic flux collecting member 46 includes a first magnetic flux collecting member 461 and a second magnetic flux collecting member 462. The first magnetic flux collecting member 461 and the second magnetic flux collecting member 462 are soft magnetic bodies, and are made of a nickel-iron alloy, for example. The first magnetic flux collecting member 461 and the second magnetic flux collecting member 462 are fixed to the sensor housing 40. As illustrated in FIG. 7, the first magnetic flux collecting member 461 faces the first ring portion 351a. There is a gap between the first magnetic flux collecting member 461 and the first ring portion 351a. The first magnetic flux collecting member 461 is magnetized according to the magnetization of the first yoke 351. The second magnetic flux collecting member 462 faces the second ring portion 352a. There is a gap between the second magnetic flux collecting member 462 and the second ring portion 352a. The second magnetic flux collecting member 462 is magnetized according to the magnetization of the second yoke 352.

Although the torque sensor 1 is basically designed on the basis of a sufficient safety factor, there is a possibility that the magnet 25 may be shifted in the axial direction with respect to the input shaft 82a together with the sleeve 21 due to vibration or shock applied to the torque sensor 1, for example. Or, the yoke 35 may be shifted in the axial direction with respect to the output shaft 82b together with the sleeve 31 and carrier 32. In the torque sensor 1 in the embodiment, the magnet 25 hits the carrier 32 even when the sleeve 21 moves relative to the input shaft 82a. The torque sensor 1, thus, allows the shift of the magnet 25 to easily become equal to or smaller than an allowable value. Even when the sleeve 31 and carrier 32 move relative to the output shaft 82b, the displacement of the yoke 35 can easily become equal to or smaller than the allowable value because the carrier 32 hits the magnet 25. The torque sensor 1, thus, has robustness. The torque sensor 1 can prevent a reduction in detection accuracy.

The printed board 43 is fixed to the sensor housing 40. The Hall IC 47 is attached to the printed board 43. The Hall IC 47 is placed between the first magnetic flux collecting member 461 and the second magnetic flux collecting member 462. There is a gap between the Hall IC 47 and the first magnetic flux collecting member 461. There is a gap between the Hall IC 47 and the second magnetic flux collecting member 462. The Hall IC 47 changes a signal to be output in accordance with a change in magnetic flux density between the first magnetic flux collecting member 461 and the second magnetic flux collecting member 462. The Hall IC 47 outputs the signal to the ECU 90.

When the steering wheel 81 is operated, torque is transferred to the input shaft 82a. Because the output shaft 82b is coupled to the input shaft 82a via the torsion bar 82c, the input shaft 82a rotates relative to the output shaft 82b. This causes the magnet 25 to rotate relative to the first teeth 351b and the second teeth 352b. This changes the intensity of magnetization of each of the first yoke 351 and the second yoke 352. Accordingly, the magnetic flux density between the first magnetic flux collecting member 461 and the second magnetic flux collecting member 462 changes. The Hall IC 47 detects the change in the magnetic flux density. The ECU 90 controls the electric motor 93 using the steering torque calculated on the basis of the output signal of the Hall IC 47.

The first cover 48 is a non-magnetic body. For example, the first cover 48 is made of resin. A specific example of the resin is polybutylene terephthalate (PBT) or polyamide 66. As illustrated in FIG. 6, the first cover 48 is attached to the rear end of the sensor housing 40. The first cover 48 covers the printed board 43.

The second cover 49 is a non-magnetic body. For example, the second cover 49 is made of resin. A specific example of the resin is polybutylene terephthalate (PBT) or polyamide 66. As illustrated in FIG. 6, the second cover 49 is attached to the front end of the sensor housing 40. As illustrated in FIG. 7, the second cover 49 includes an annular body portion 491 and a plurality of claw portions 492. The claw portions 492 are arranged at equal intervals in the circumferential direction. The claw portions 492 protrude on the front side from the body portion 491. The claw portions 492 are inserted into the intermediate plate 10 by light press fitting and are in contact with the inner circumferential surface of the intermediate plate 10. Thus, the center of the sensor housing 40 when viewed from the axial direction easily coincides with the center of the intermediate plate 10.

FIGS. 12 to 18 are schematic diagrams illustrating a manufacturing method of the magnet assembly in the embodiment. The manufacturing method of the magnet assembly 20 in the embodiment includes a sleeve machining process, a first mold placement step, an intermediate member formation step, a second mold placement step, and a magnet formation step.

Figure 12:
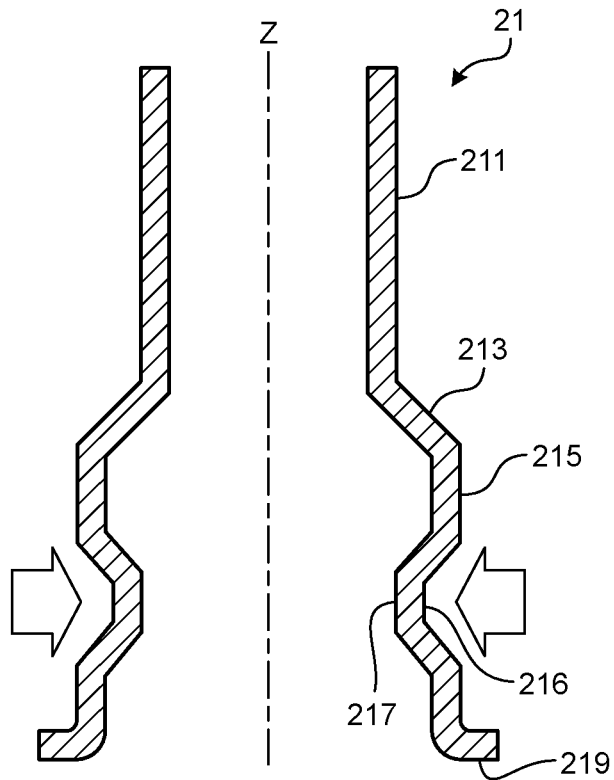
FIG. 12 is a schematic diagram illustrating a manufacturing method of the magnet assembly in the embodiment (plastically deforming process of an outer circumferential surface).

As illustrated in FIG. 12, at the sleeve machining process, the outer circumferential surface of the intermediate member connecting portion 215 is plastically deformed in the radial direction. For example, the concave portions 216 and the convex portions 217 are formed by plastically deforming the outer circumferential surface of the intermediate member connecting portion 215 inward in the radial direction by press working.

Figure 13:
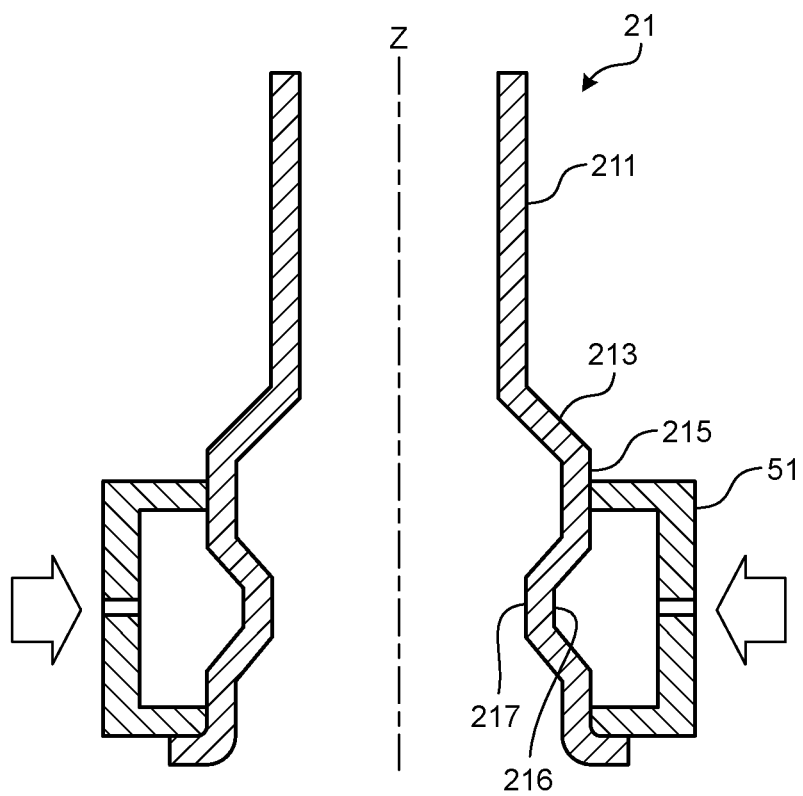
FIG. 13 is a schematic diagram illustrating the manufacturing method of the magnet assembly in the embodiment (first mold placement process).

After the sleeve machining process, the first mold placement step is performed. As illustrated in FIG. 13, at the first mold placement step, a first mold 51 is placed outside the intermediate member connecting portion 215. The first mold 51 is a hollow mold made of metal. The first mold 51 includes an introduction channel for introducing resin and a discharge channel for discharging the resin. The first mold 51 can be divided into two parts along the plane containing the central axis Z. The divided two parts of the first mold 51 are attached to the intermediate member connecting portion 215 from both sides as illustrated with the arrows in FIG. 13.

Figure 14:
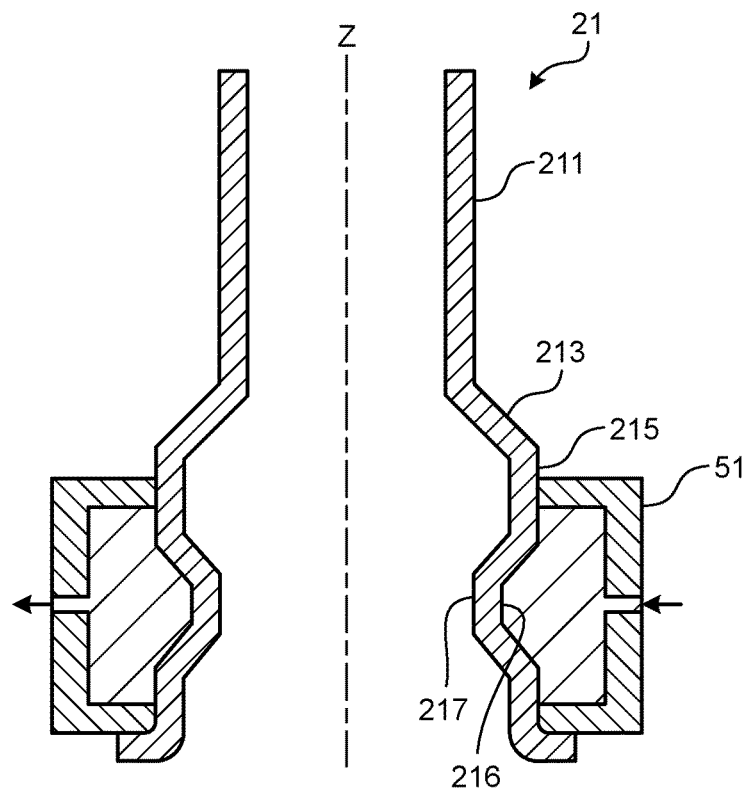
FIG. 14 is a schematic diagram illustrating the manufacturing method of the magnet assembly in the embodiment (intermediate member filling process).
Figure 15:
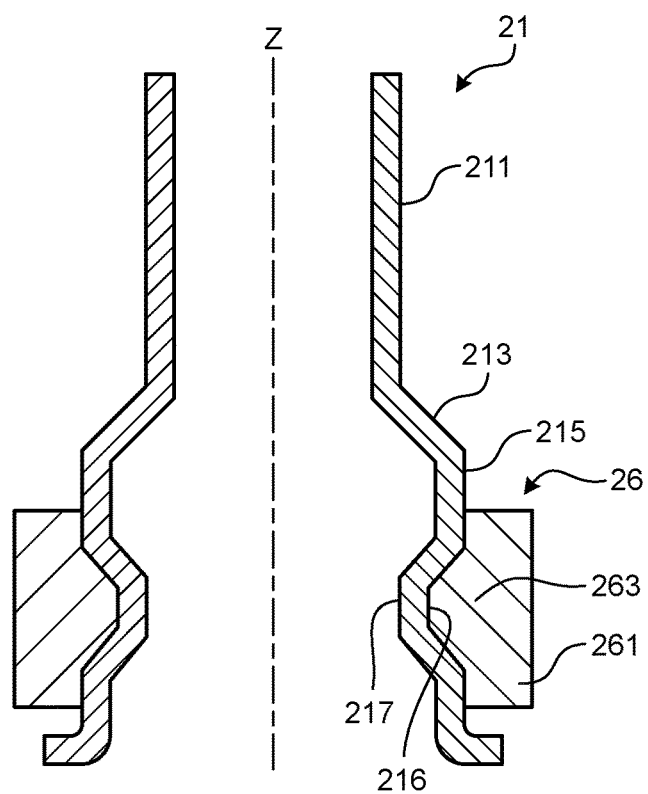
FIG. 15 is a schematic diagram illustrating the manufacturing method of the magnet assembly in the embodiment (first mold removal process).

After the first mold placement step, the intermediate member formation step is performed. As illustrated in FIG. 14, at the intermediate member formation step, the first mold 51 is filled with resin. The intermediate member formation step employs injection molding. In other words, a nozzle of a cylinder filled with the molten resin is set to the introduction channel of the first mold 51. The molten resin is extruded from the cylinder and enters the first mold 51. The excess molten resin is discharged from the discharge channel of the first mold 51. As illustrated in FIG. 15, after the molten resin in the first mold 51 is cooled, the first mold 51 is removed. As a result, the intermediate member 26, which includes the thin portion 261 and the thick portions 263, is formed.

Figure 16:
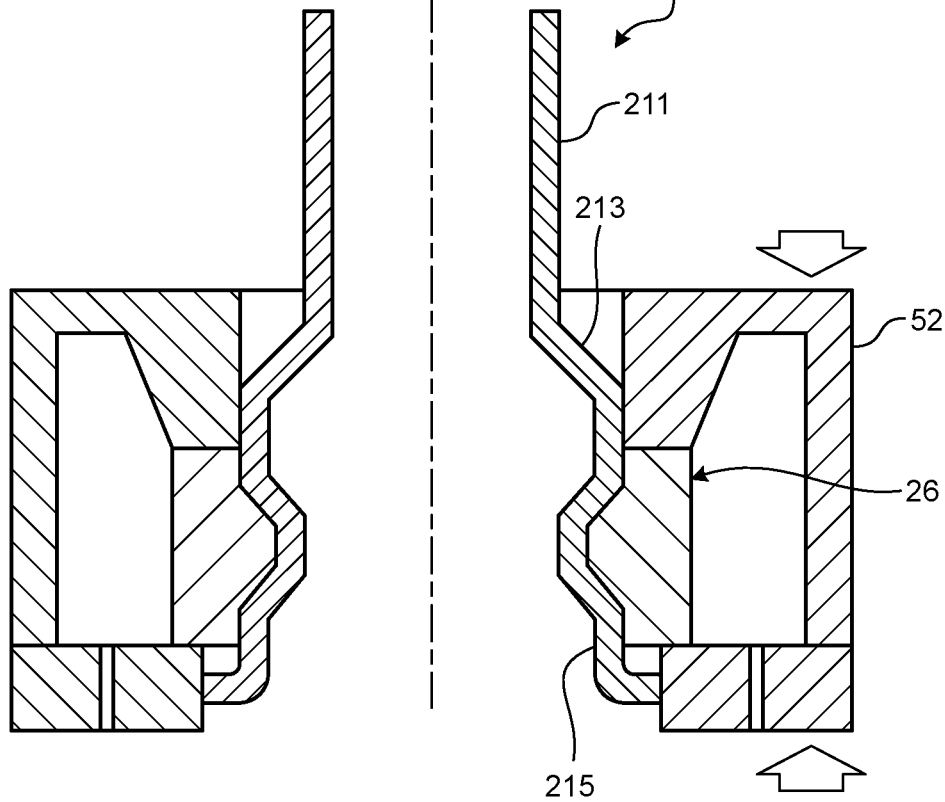
FIG. 16 is a schematic diagram illustrating the manufacturing method of the magnet assembly in the embodiment (second mold placement process).

After the intermediate member formation step, the second mold placement step is performed. As illustrated in FIG. 16, at the second mold placement step, a second mold 52 is placed outside the intermediate member 26. The second mold 52 is a hollow mold made of metal. The second mold 52 includes an introduction channel for introducing resin and a discharge channel for discharging the resin. The second mold 52 can be divided into two parts along a plane orthogonal to the central axis Z. The divided two parts of the second mold 52 are attached to the intermediate member 26 from both sides as illustrated with the arrows in FIG. 16.

Figure 17:
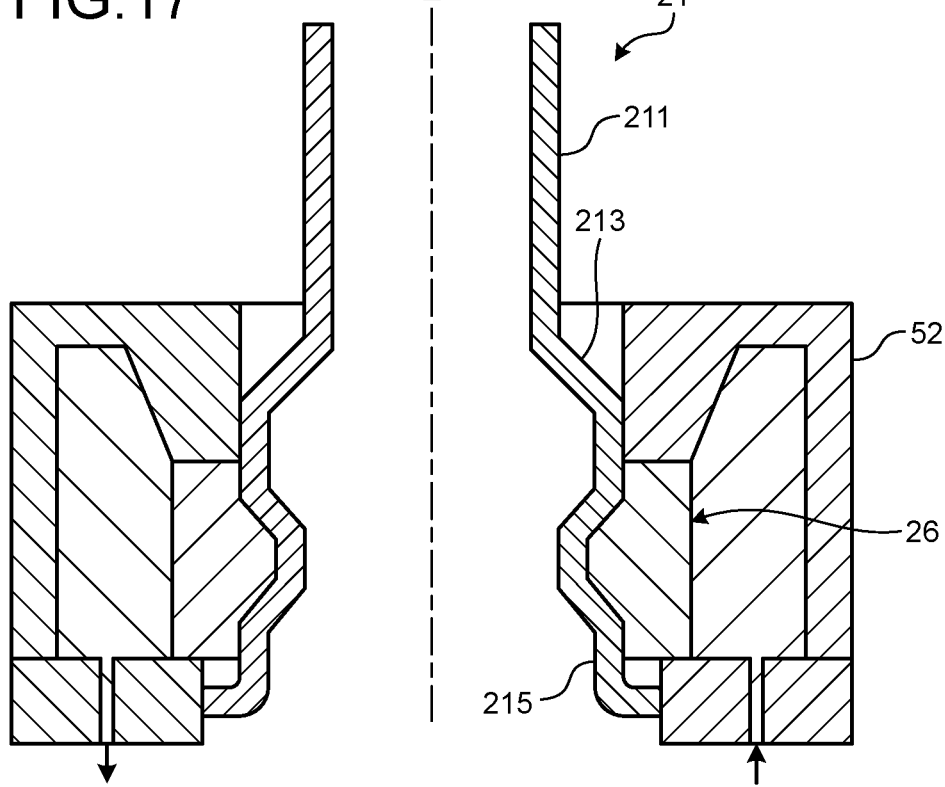
FIG. 17 is a schematic diagram illustrating the manufacturing method of the magnet assembly in the embodiment (magnet filling process).
Figure 18:
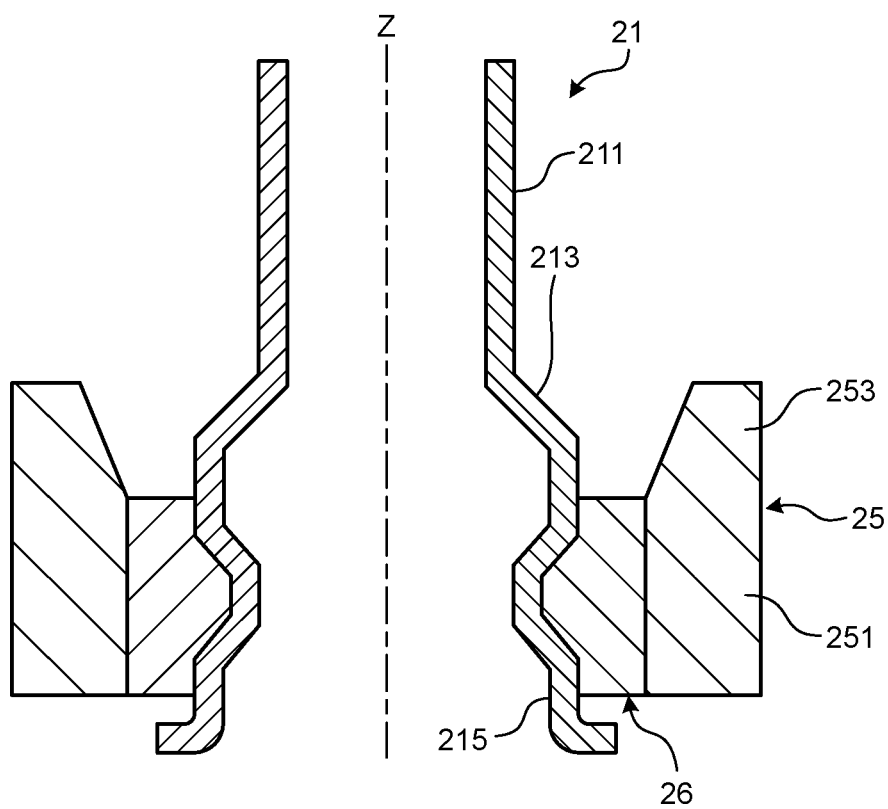
FIG. 18 is a schematic diagram illustrating the manufacturing method of the magnet assembly in the embodiment (second mold removal process).

After the second mold placement step, the magnet formation step is performed. As illustrated in FIG. 17, at the magnet formation step, the second mold 52 is filled with resin. The magnet formation step employs injection molding. In other words, a nozzle of a cylinder filled with the molten resin is set to the introduction channel of the second mold 52. The molten resin is extruded from the cylinder and enters the second mold 52. The excess molten resin is discharged from the discharge channel of the second mold 52. As illustrated in FIG. 18, after the molten resin in the second mold 52 is cooled, the second mold 52 is removed. As a result, the magnet 25, which includes the attaching portion 251 and the tapered portion 253, is formed.

The sleeve 21 is not necessarily attached to the input shaft 82a. For example, the sleeve 21 and magnet 25 may be attached to the output shaft 82b, and the sleeve 31 and yoke 35 may be attached to the input shaft 82a. When the sleeve 21 is attached to the output shaft 82b, the sleeve 21 is press-fitted into the outer circumferential surface of the output shaft 82b.

The intermediate member connecting portion 215 of the sleeve 21 does not necessarily include the concave portions 216 and the convex portions 217. The intermediate member connecting portion 215 may include a portion to which the thick portion 263 is caught. For example, the intermediate member connecting portion 215 may have a through hole, and the thick portion 263 may be put in the through hole. The outer diameter of the intermediate member connecting portion 215 is not necessarily larger than that of the rotating member connecting portion 211. The outer diameter of the intermediate member connecting portion 215 may be smaller than or the same as that of the rotating member connecting portion 211.

As explained above, the torque sensor 1 in the embodiment includes the sleeve 21, the intermediate member 26, the magnet 25, and the yoke 35. The sleeve 21 is an annular member that is attached to the first rotating member (input shaft 82a). The intermediate member 26 is an annular member that is placed on the outer circumferential surface of the sleeve 21. The magnet 25 is an annular member that is placed on the outer circumferential surface of the intermediate member 26. The yoke 35 is attached to the second rotating member (output shaft 82b), which rotates with respect to the first rotating member, and faces the magnet 25 in the radial direction orthogonal to the central axis Z of the sleeve 21. The sleeve 21 includes the rotating member connecting portion 211 and the intermediate member connecting portion 215. The rotating member connecting portion 211 has a cylindrical shape and is in contact with the first rotating member. The intermediate member connecting portion 215 has a cylindrical shape and is at a position shifted with respect to the rotating member connecting portion 211 in the axial direction parallel to the central axis Z. The intermediate member 26 includes the thin portion 261 and the thick portions 263 having a thickness greater than that of the thin portion 261. The inner circumferential surface of the thin portion 261 and the inner circumferential surface of the thick portions 263 are in contact with the intermediate member connecting portion 215.

The rotating member connecting portion 211 in contact with the first rotating member (input shaft 82a) prevents deformation of the intermediate member connecting portion 215 that holds the magnet 25 when the sleeve 21 is press-fitted into the first rotating member. This makes it hard for the distance between the magnet 25 and the yoke 35 (first teeth portion 351b and second teeth portion 352b) to deviate from a design value. The torque sensor 1 can prevent a reduction in detection accuracy. The magnet is attached to the sleeve with the adhesive in Patent Literature 1. This needs to position the magnet to the sleeve before the magnet is attached to the sleeve, which complicates the production process in producing the sensor. In contrast, in the torque sensor 1 in the embodiment, the intermediate member 26 includes the thin portion 261 and the thick portions 263. This causes the thick portion 263 to caught on the outer circumferential surface of the sleeve 21. This prevents the relative movement of the intermediate member 26 and the sleeve 21 in the axial and circumferential directions. When the torque sensor 1 in the embodiment is produced in the aforementioned manner, the production process can be simplified because it is unnecessary to position the magnet 25 to the sleeve 21, because the magnet 25 is formed on the outer circumferential surface of the intermediate member 26 after the intermediate member 26 is formed on the outer circumferential surface of the sleeve 21.

In the torque sensor 1 in the embodiment, the outer diameter of the intermediate member connecting portion 215 is larger than that of the rotating member connecting portion 211.

As a result, the stress generated in the rotating member connecting portion 211 in the process in which the sleeve 21 is press-fitted into the input shaft 82a is absorbed by the deformation of the enlarged portion 213 between the rotating member connecting portion 211 and the intermediate member connecting portion 215. This can prevent the stress generated in the press fitting process of the sleeve 21 from being transferred to the intermediate member connecting portion 215.

In the torque sensor 1 in the embodiment, the outer diameter of the intermediate member connecting portion 215 may be smaller than that of the rotating member connecting portion 211.

This allows the magnet 25 to be placed more inward in the radial direction than the case where the outer diameter of the intermediate member connecting portion 215 is larger than that of the rotating member connecting portion 211. This makes it possible to downsize the torque sensor 1.

The outer diameter of the intermediate member connecting portion 215 may be the same as that of the rotating member connecting portion 211.

This allows the magnet 25 to be placed more inward in the radial direction than the case where the outer diameter of the intermediate member connecting portion 215 is larger than that of the rotating member connecting portion 211. This makes it possible to downsize the torque sensor 1. In addition, the shape of the sleeve 21 is simplified, thereby making it possible to simplify the manufacturing process of the sleeve 21.

In the torque sensor 1 in the embodiment, the magnet 25 includes the tapered portion 253 having a thickness decreasing toward one end in the axial direction. The tapered portion 253 faces the rotating member connecting portion 211 in the radial direction.

In order to reduce the stress acting on the magnet 25 when the rotating member connecting portion 211 is press-fitted into the first rotating member (input shaft 82a), a gap in the radial direction is provided between the magnet 25 and the small-diameter portion. In order to form the gap, it is necessary to penetrate the mold (second mold 52) into the gap when the magnet 25 is formed. In the torque sensor 1 in the embodiment, the magnet 25 including the tapered portion 253 makes it easy to remove the mold used for forming the magnet 25.

In the torque sensor 1 in the embodiment, the intermediate member 26 includes an even number of thick portions 263. The even number of thick portions 263 are arranged at equal intervals in the circumferential direction.

The concave portions, which correspond to the thick portions 263, of the sleeve 21 are formed by press working, for example. The even number of concave portions arranged at equal intervals in the circumferential direction make it easy to perform press working on the sleeve 21. It is suitable to form the concave portions by press working when the sleeve 21 has a thin cylindrical shape. The sleeve having a thin cylindrical shape makes it possible to achieve a weight reduction in the torque sensor 1.

In the torque sensor 1 in the embodiment, in the cross section including the central axis Z, the thick portion 263 is between one part of the thin portion 261 and the other part of the thin portion 261 in the axial direction.

If the thick portion 263 is placed at the end in the axial direction of the intermediate member 26, in order to stop the movement of the intermediate member 26 relative to the sleeve 21, it is necessary to provide the thick portions 263 at both ends of the intermediate member 26. This means that the thick portions 263 need to be arranged in two rows. In contrast, the torque sensor 1 in the embodiment can stop the movement of the intermediate member 26 relative to the sleeve 21 by at least one thick portion 263. The torque sensor 1 in the embodiment can reduce the number of thick portions 263 required.

In the torque sensor 1 in the embodiment, the intermediate member connecting portion 215 includes the concave portions 216 provided on the outer circumferential surface and the convex portions 217 provided on the back sides of the concave portions 216.

This allows the concave portions 216 and the convex portions 217 to be easily formed by press working. The torque sensor 1 in the embodiment can simplify the process of forming the portions to which the thick portions 263 are caught on the sleeve 21.

In the torque sensor 1 in the embodiment, the convex portions 217 are placed outside the inner circumferential surface of the rotating member connecting portion 211 in the radial direction from.

This prevents the convex portions 217 from hitting the first rotating member (input shaft 82a) when the sleeve 21 is press-fitted into the first rotating member. As a result, no force is directly applied from the first rotating member to the intermediate member connecting portion 215. The torque sensor 1 in the embodiment can reduce the stress generated in the intermediate member 26 and the magnet 25.

In the torque sensor 1 in the embodiment, the distance L1 in the radial direction between the magnet 25 and the yoke 35 is smaller than the thickness difference L2 between the thin portion 261 and the thick portion 263.

As a result, even if an abnormality occurs in the magnet 25 and the magnet 25 moves in the direction of approaching the yoke 35, the thick portions 263 remain caught to the sleeve 21. This prevents the magnet 25 from dropping out from the sleeve 21. The torque sensor 1 in the embodiment can reduce a possibility of no signal being output.

In the torque sensor 1 in the embodiment, the intermediate member 26 is made of resin. The magnet 25 contains magnetic powder and resin. The coefficient of linear expansion of the intermediate member 26 is smaller than that of the resin of the magnet 25.

This allows the torque sensor 1 in the embodiment to reduce the stress generated in the intermediate member 26 and magnet 25 even when the intermediate member 26 and magnet 25 are exposed to an environment with temperature changes.

In the torque sensor 1 in the embodiment, the intermediate member 26 is made of resin. The magnet 25 contains magnetic powder and resin. The resin of the intermediate member 26 and the resin of the magnet 25 are the same material.

This allows the torque sensor 1 in the embodiment to reduce the stress generated in the intermediate member 26 and magnet 25 even when the intermediate member 26 and magnet 25 are exposed to an environment with temperature changes.

The manufacturing method of the magnet assembly 20 in the embodiment includes the first mold placement step, the intermediate member formation step, the second mold placement step, and the magnet formation step. The first mold placement step is the process of placing the first mold 51 outside the intermediate member connecting portion 215. The intermediate member formation step is the process of forming the intermediate member 26 including the thin portion 261 and the thick portions 263 having a thickness greater than that of the thin portion 261 by filling the first mold 51 with resin. The second mold placement step is the process of placing the second mold 52 outside the intermediate member 26. The magnet formation step is the process of forming the magnet 25 by filling the second mold 52 with resin containing magnetic powder.

This causes the intermediate member 26 and the magnet 25, which contain the resin, to adhere firmly to each other. This prevents the relative movement of the intermediate member 26 and the magnet 25 in the axial and circumferential directions. The intermediate member 26 includes the thin portion 261 and the thick portions 263. This causes the thick portion 263 to caught on the outer circumferential surface of the sleeve 21. This prevents the relative movement of the intermediate member 26 and the sleeve 21 in the axial and circumferential directions. This reduces the possibility of a positional shift of the 25 magnet. The manufacturing method of the magnet assembly 20 in the embodiment can further prevent a reduction in detection accuracy.

The manufacturing method of the magnet assembly 20 in the embodiment includes the sleeve machining process in which the outer circumferential surface of the intermediate member connecting portion 215 is plastically deformed in the radial direction, which is the direction orthogonal to the central axis Z, prior to the first mold placement step.

This allows the manufacturing method of the magnet assembly 20 in the embodiment to easily form the portions to which the thick portions 263 are caught on the sleeve 21 by press working, for example.

In the manufacturing method of the magnet assembly 20 in the embodiment, the intermediate member forming step and the magnet forming step employ the injection molding.

This allows the manufacturing method of the magnet assembly 20 in the embodiment to more easily form the intermediate member 26 and the magnet 25.

The torque sensor 1 in the embodiment includes the sleeve 21, the intermediate member 26, the magnet 25, and the yoke 35. The sleeve 21 is an annular member that is attached to the first rotating member (input shaft 82a). The intermediate member 26 is an annular member that is placed on the outer circumferential surface of the sleeve 21. The magnet 25 is an annular member that is placed on the outer circumferential surface of the intermediate member 26. The yoke 35 is attached to the second rotating member (output shaft 82b), which rotates with respect to the first rotating member, and faces the magnet 25 in the radial direction orthogonal to the central axis Z of the sleeve 21. The sleeve 21 includes the rotating member connecting portion 211 and the intermediate member connecting portion 215. The rotating member connecting portion 211 has a cylindrical shape and is in contact with the first rotating member. The intermediate member connecting portion 215 has a cylindrical shape and is at a position shifted with respect to the rotating member connecting portion 211 in the axial direction parallel to the central axis Z. The outer diameter E219 of the sleeve end 219, which is the end of the intermediate member connecting portion 215 on the opposite side from the rotating member connecting portion 211, is smaller than the minimum inner diameter 125 of the magnet 25.

The rotating member connecting portion 211 in contact with the first rotating member (input shaft 82a) prevents deformation of the intermediate member connecting portion 215 that holds the magnet 25 when the sleeve 21 is press-fitted into the first rotating member. This makes it hard for the distance between the magnet 25 and the yoke 35 (first teeth portion 351b and second teeth portion 352b) to deviate from a design value. The torque sensor 1 can prevent a reduction in detection accuracy. It is desirable that the sleeve supporting the magnet in Patent Literature 1 is compact in the radial direction while having small-diameter portion and the large-diameter portion. However, if the step between the small-diameter portion and the large-diameter portion is made smaller, the step between the small-diameter portion and the large-diameter portion cannot be pushed when the sleeve is press-fitted into the steering shaft. The tip of the large-diameter portion can be pushed instead of the step, but pushing the tip of the large-diameter portion may cause stress on the magnet. Stress occurring in the magnet changes the magnetic properties of the magnet, which may result in the production of magnet that does not meet shipping specifications. This, thus, lowers the yield rate in the manufacturing of the steering device. In contrast, in the torque sensor 1 in the embodiment, the outer diameter E219 of the sleeve end 219 is smaller than the minimum inner diameter 125 of the magnet 25. Even if the sleeve end 219 is pushed when the sleeve 21 is press-fitted into the first rotating member, stress hardly occurs in the magnet 25. The torque sensor 1 in the embodiment can prevent a reduction in detection accuracy and prevent stress from occurring in the magnet 25 when the sleeve 21 is fixed to the rotating member.

In the torque sensor 1 in the embodiment, the outer diameter E219 of the sleeve end 219 is larger than the inner diameter I269 of the intermediate member end 269, which is the end of the intermediate member 26 on the opposite side from the rotating member connecting portion 211, and smaller than the outer diameter E269 of the intermediate member end 269.

This reduces the possibility of a positional shift of the intermediate member 26 because the sleeve end 219 locks the intermediate member 26. The torque sensor 1 in the embodiment can further reduce the possibility of a reduction in detection accuracy.

In the torque sensor 1 in the embodiment, the intermediate member 26 is placed with the gap C in the axial direction with respect to the sleeve end 219.

This makes it hard for the intermediate member 26 to be deformed even if the sleeve end 219 is pushed when the sleeve 21 is press-fitted into the first rotating member. As a result, stress more hardly occurs in the magnet 25 in contact with the intermediate member 26. The torque sensor 1 in the embodiment can further prevent the stress generated in the magnet 25 when the sleeve 21 is fixed to the rotating member.

First Modification

Figure 19:
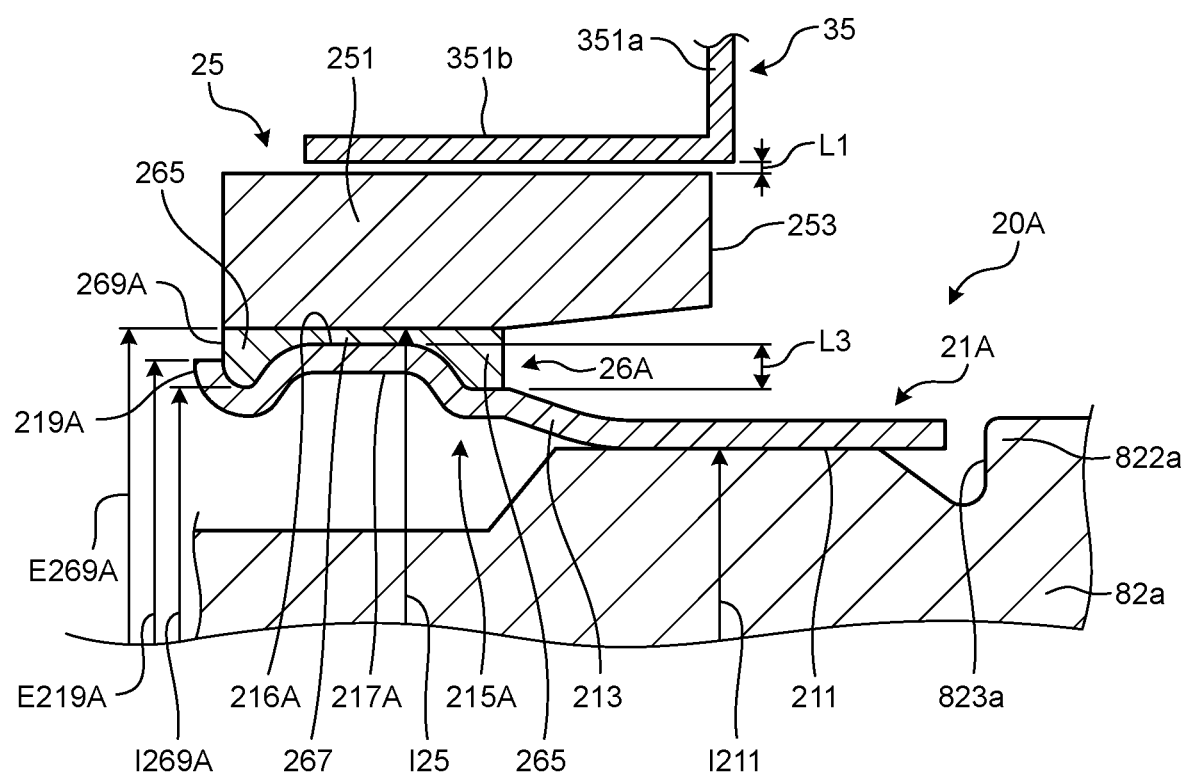
FIG. 19 is a cross-sectional view of a periphery of a magnet assembly of a first modification.

FIG. 19 illustrates a cross-sectional view of a periphery of a magnet assembly in a first modification. The same numerals are attached to the same constituent components as described in the above embodiment, and duplicate explanations are omitted.

As illustrated in FIG. 19, a magnet assembly 20A in the first modification includes a sleeve 21A and an intermediate member 26A. The sleeve 21A includes an intermediate member connecting portion 215A. The intermediate member connecting portion 215A includes a plurality of convex portions 216A, a plurality of concave portions 217A, and a sleeve end 219A. The convex portions 216A are provided on the outer circumferential surface of the intermediate member connecting portion 215A. The concave portions 217A are provided on the inner circumferential surface of the intermediate member connecting portion 215A. The concave portions 217A are provided on the back sides of the convex portions 216A. The convex portions 216A and concave portions 217A are formed at once by press working, for example. In other words, the convex portions 216A and the concave portions 217A are formed by plastically deforming the outer circumferential surface of the intermediate member connecting portion 215A outward in the radial direction. The convex portions 216A and the concave portions 217A are arranged at equal intervals in the circumferential direction. The sleeve end 219A is the end of the intermediate member connecting portion 215A on the opposite side (front side) from the rotating member connecting portion 211. The sleeve end 219A extends outward in the radial direction.

The intermediate member 26A includes a thick portion 265, a plurality of thin portions 267, and an intermediate member end 269A. The thickness of the thin portion 267 is smaller than that of the thick portion 265. The thick portion 265 is formed in an annular shape, and an even number of thin portions 267 are arranged at equal intervals in the circumferential direction. In the cross section including the central axis Z, the thin portion 267 is between one part of the thick portion 265 and the other part of the thick portion 265 in the axial direction. The thin portions 267 are sandwiched between the thick portion 265 from both sides in the axial direction. In other words, in the cross section including the central axis Z, the thickness of the intermediate member 26A is not constant, but varies depending on its position in the axial direction. The inner circumferential surfaces of the thick portion 265 and thin portions 267 are in contact with the outer circumferential surface of the intermediate member connecting portion 215A. The distance L1 in the radial direction between the magnet 25 and the yoke 35 is smaller than the thickness difference L3 between the thin portion 261 and the thick portion 263.

The intermediate member end 269A is the end of the intermediate member 26A on the opposite side (front side) from the rotating member connecting portion 211. When viewed from the axial direction, a part of the intermediate member end 269A overlaps with the sleeve end 219A. An outer diameter E219A of the sleeve end 219A is larger than an inner diameter I269A of the intermediate member end 269A and smaller than an outer diameter E269A of the intermediate member end 269A. In the same manner as the relation between the intermediate member end 269 and the sleeve end 219 illustrated in FIG. 9, the intermediate member end 269A is placed with a gap in the axial direction with respect to the sleeve end 219A.

As explained above, in the first modification, the intermediate member 26 includes an even number of thin portions 267. When viewed from the axial direction, the even number of thin portions 267 are arranged at equal intervals in the circumferential direction, which is the direction along the circumference centered on the central axis Z.

The convex portions, which correspond to the thin portions 267, of the sleeve 21A are formed by press working, for example. The even number of convex portions arranged at equal intervals in the circumferential direction make it easy to perform press working on the sleeve 21. It is suitable to form the convex portions by press working when the sleeve 21A has a thin cylindrical shape. The sleeve having a thin cylindrical shape makes it possible to achieve a weight reduction in the torque sensor 1.

Second Modification

Figure 20:
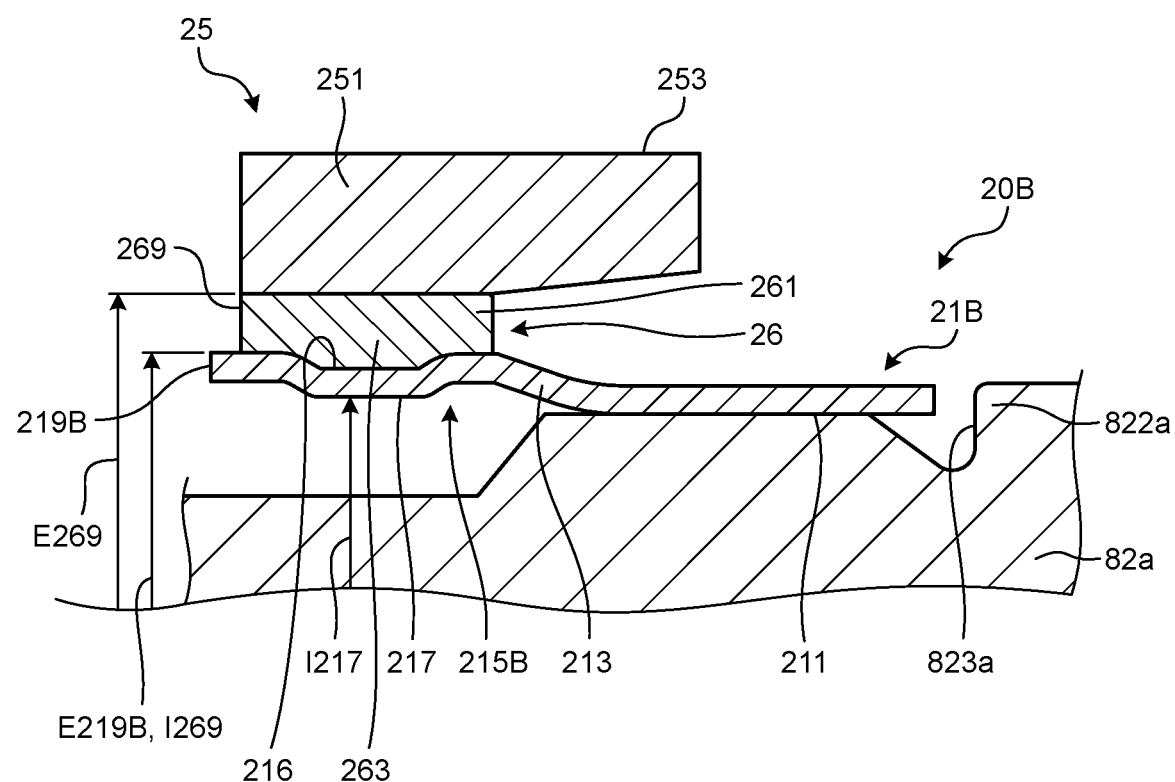
FIG. 20 is a cross-sectional view of a periphery of a magnet assembly of a second modification.

FIG. 20 is a cross-sectional view of a periphery of a magnet assembly in a second modification. The same numerals are attached to the same constituent components as described in the above embodiment, and duplicate explanations are omitted.

As illustrated in FIG. 20, a magnet assembly 20B in the second modification includes a sleeve 21B. The sleeve 21B includes an intermediate member connecting portion 215B. The intermediate member connecting portion 215B includes a sleeve end 219B. The sleeve end 219B is the end of the intermediate member connecting portion 215B on the opposite side (front side) from the rotating member connecting portion 211. The sleeve end 219B extends outward in the radial direction.

When viewed from the axial direction, the intermediate member end 269 does not overlap with the sleeve end 219B. An outer diameter E219B of the sleeve end 219B is equal to or smaller than an inner diameter I269 of the intermediate member end 269. For example, in the second modification, the outer diameter E219B of the sleeve end 219B is equal to the inner diameter I269 of the intermediate member end 269. The sleeve end 219B protrudes in the axial direction (front side) with respect to the plane passing through the end surfaces of the intermediate member 26 and magnet 25.

As explained above, in the second modification, the outer diameter E219B of the sleeve end 219B is equal to or smaller than the inner diameter I269 of the intermediate member end 269, which is the end of the intermediate member 26 on the opposite side from the rotating member connecting portion 211.

This makes it hard for the intermediate member 26 to be deformed even if the sleeve end 219B is pushed when the sleeve 21B is press-fitted into the first rotating member. As a result, stress more hardly occurs in the magnet 25 in contact with the intermediate member 26. The magnet assembly 20B in the second modification can further prevent the stress generated in the magnet 25 when the sleeve 21B is fixed to the rotating member.

REFERENCE SIGNS LIST 1 torque sensor
10 intermediate plate 20, 20A, 20B magnet assembly
21, 21A, 21B sleeve
25 magnet
26, 26A intermediate member
31 sleeve
32 carrier
35 yoke
40 sensor housing
43 printed board
46 magnetic flux collecting member
47 Hall IC
71, 72 bearing
80 steering device
81 steering wheel
82 steering shaft
82a input shaft
82b output shaft
82c torsion bar
83 steering force assist mechanism
84 universal joint
85 intermediate shaft
86 universal joint
87 pinion shaft
88 steering gear
88a pinion
88b rack
89 tie rods
90 ECU
92 reduction gear
93 electric motor
95 vehicle speed sensor
98 ignition switch
99 power supply device
211 rotating member connecting portion
213 enlarged portion
215, 215A, 215B intermediate member connecting portion
216 concave portion
216A convex portion
217 convex portion
217A concave portion
219, 219A, 219B sleeve end
251 attaching portion
253 tapered portion
261 thin portion
263 thick portion
265 thick portion
267 thin portion
269, 269A intermediate member end
321 small-diameter portion
322 large-diameter portion
327 protrusion
920 gearbox
921 worm wheel
922 worm
C gap
L1 distance
L2, L3 thickness difference
Z central axis

The invention claimed is:

1. A torque sensor, comprising:
an annular sleeve that is attached to a first rotating member;
an annular intermediate member that is placed on an outer circumferential surface of the sleeve;
an annular magnet that is placed on an outer circumferential surface of the intermediate member; and
a yoke that is attached to a second rotating member rotating with respect to the first rotating member and faces the magnet in a radial direction orthogonal to a central axis of the sleeve, wherein
the sleeve includes:
a rotating member connecting portion that has a cylindrical shape and is in contact with the first rotating member; and
an intermediate member connecting portion that has a cylindrical shape and is at a position shifted with respect to the rotating member connecting portion in an axial direction parallel to the central axis,
the intermediate member includes: a thin portion; and a thick portion having a thickness larger than a thickness of the thin portion, and
an inner circumferential surface of the thin portion and an inner circumferential surface of the thick portion are in contact with the intermediate member connecting portion.

2. The torque sensor according to claim 1, wherein an outer diameter of the intermediate member connecting portion is larger than an outer diameter of the rotating member connecting portion.

3. The torque sensor according to claim 1, wherein an outer diameter of the intermediate member connecting portion is smaller than an outer diameter of the rotating member connecting portion.

4. The torque sensor according to claim 1, wherein an outer diameter of the intermediate member connecting portion and an outer diameter of the rotating member connecting member are equal.

5. The torque sensor according to claim 1, wherein
the magnet includes a tapered portion having a thickness decreasing toward one end in the axial direction, and
the tapered portion faces the rotating member connecting portion in the radial direction.

6. The torque sensor according to claim 1, wherein
the intermediate member includes an even number of thin portions or an even number of thick portions, and
when viewed from the axial direction, the even number of thin portions or the even number of thick portions are arranged at equal intervals in a circumferential direction along a circumference centered on the central axis.

7. The torque sensor according to claim 1, wherein, in a cross section including the central axis, the thick portion is between one part of the thin portion and another part of the thin portion in the axial direction.

8. The torque sensor according to claim 1, wherein the intermediate member connecting portion includes a concave portion provided on an outer circumferential surface of the intermediate member connecting portion and a convex portion provided at a position corresponding to the concave portion on an inner circumferential surface of the intermediate member connecting portion.

9. The torque sensor according to claim 8, wherein the convex portion is placed outside an inner circumferential surface of the rotating member connecting portion in the radial direction.

10. The torque sensor according to claim 1, wherein a distance in the radial direction between the magnet and the yoke is smaller than a thickness difference between the thin portion and the thick portion.

11. The torque sensor according to claim 1, wherein
the intermediate member is made of resin,
the magnet contains magnet powder and resin, and a linear expansion coefficient of the intermediate member is smaller than a linear expansion coefficient of the resin of the magnet.

12. The torque sensor according to claim 1, wherein the intermediate member is made of resin, the magnet contains magnet powder and resin, and the resin of the intermediate member and the resin of the magnet are the same material.

13. A manufacturing method of a magnet assembly of a torque sensor that includes:

an annular sleeve for attaching to a first rotating member;

an annular intermediate member placed on an outer circumferential surface of the sleeve; and an annular magnet placed on an outer circumferential surface of the intermediate member, wherein the sleeve includes:

a rotating member connecting portion having a cylindrical shape; and an intermediate member connecting portion that has a cylindrical shape and is at a position shifted with respect to the rotating member connecting portion in an axial direction parallel to a central axis of the sleeve, the manufacturing method comprising:

a first mold placement step of placing a first mold outside the intermediate member connecting portion;

an intermediate member forming step of filling the first mold with resin to form the intermediate member including a thin portion and a thick portion having a thickness greater than a thickness of the thin portion;

a second mold placement step of placing a second mold outside the intermediate member; and a magnet forming step of filling the second mold with resin containing magnetic powder to form the magnet.

14. The manufacturing method of a magnet assembly according to claim 13, further comprising a sleeve machining process of plastically deforming an outer circumferential surface of the intermediate member connecting portion in a radial direction orthogonal to the central axis, prior to the first mold placement step.

15. The manufacturing method of a magnet assembly according to claim 13, wherein injection molding is used at the intermediate member forming step and at the magnet forming step.

* * * * *